US006458912B1

(12) United States Patent
Kuroki et al.

(10) Patent No.: US 6,458,912 B1
(45) Date of Patent: Oct. 1, 2002

(54) CRYSTALLINE POLYIMIDE FOR MELT MOLDING WITH SATISFACTORY THERMAL STABILITY

(75) Inventors: Takashi Kuroki; Yoshihiro Sakata; Tomomi Okumura; Atsushi Shibuya; Yuichi Okawa, all of Kanagawa; Hideaki Oikawa, Fukuoka; Kayako Yanagihara, Kanagawa; Yasunori Yoshida, Kanagawa; Masaji Yoshimura, Kanagawa; Hiroyasu Kido, Kanagawa; Shoji Tamai, Kanagawa, all of (JP)

(73) Assignee: Mitsui Chemicals, Inc. (JP)

( * ) Notice: Subject to any disclaimer, the term of this patent is extended or adjusted under 35 U.S.C. 154(b) by 0 days.

(21) Appl. No.: 09/674,916

(22) PCT Filed: May 13, 1999

(86) PCT No.: PCT/JP99/02481

§ 371 (c)(1),
(2), (4) Date: Feb. 5, 2001

(87) PCT Pub. No.: WO99/58595

PCT Pub. Date: Nov. 18, 1999

(30) Foreign Application Priority Data

| May 13, 1998 | (JP) | 10-130483 |
| May 19, 1998 | (JP) | 10-137148 |
| Jul. 31, 1998 | (JP) | 10-217981 |

(51) Int. Cl.$^7$ .............................................. C08G 73/00
(52) U.S. Cl. ...................................................... 528/170
(58) Field of Search .......................................... 528/170

(56) References Cited

U.S. PATENT DOCUMENTS

| 5,210,084 A | 5/1993 | Wollweber et al. |
| 5,354,839 A | 10/1994 | Yamashita et al. |

FOREIGN PATENT DOCUMENTS

| EP | 0 565 352 A2 | 10/1993 |
| JP | 05286907 | 11/1993 |
| JP | 06100506 | 4/1994 |
| JP | 06100507 | 4/1994 |
| JP | 06157428 | 6/1994 |
| JP | 06207015 | 7/1994 |
| JP | 11-114744 | 4/1999 |

*Primary Examiner*—Terressa M. Boykin
(74) *Attorney, Agent, or Firm*—Burns, Doane, Swecker & Mathis, L.L.P.

(57) ABSTRACT

A thermoplastic polyimide having good thermal stability, comprising a repeating unit represented by the chemical formula (1), a molecular terminal being composed of the chemical formula (2) and/or chemical formula (3), characterized in that: a melt viscosity ratio calculated by the numerical formula (1) and/or the numerical formula (3) is within a numerical range shown in the numerical formula (2) and/or the numerical formula (4) and 1,3-bis(4-aminophenoxy)benzene represented by the chemical formula (3) for production of the above polyimide, characterized in that the content of an azo compound is from 0.0 to 0.2%. The thermoplastic polyimide of the present invention has excellent characteristics ①  to ④ described below. ① It is superior in thermal stability on melting. That is, the degree of lowering of the fluidity on melting with a lapse of time is small and it is possible to apply to conventional melt molding. ② It has high heat resistance. ③ It is superior in productivity. ④ It is superior in dimensional accuracy.

16 Claims, 2 Drawing Sheets

Isothermal viscosity sweeps
; Macromolecules 1997,30,1012-1022

CRYSTALLINE POLYIMIDE FOR MELT MOLDING WITH SATISFACTORY THERMAL STABILITY

TECHNICAL FIELD

The present invention relates to a thermoplastic polyimide, and an aromatic diamine compound used in the production of the polyimide.

The thermoplastic polyimide of the present invention has at least excellent characteristics ① to ④ described below.

① It is superior in thermal stability on melting. That is, the degree of lowering of the fluidity on melting with a lapse of time is small. It was difficult to realize this feature in the prior art.

② It has high heat resistance. That is, it has excellent mechanical strength even at the temperature higher than a glass transition temperature (Tg) because of its high crystallizability.

③ It is superior in productivity. That is, since a crystallization rate is large, it is crystallized during a normal short molding cycle without requiring a special heat-treating operation such as operation of slowly cooling in a mold on molding, operation of heat-treating after molding or the like.

④ It is superior in dimensional accuracy. That is, since a crystallization rate is large and it is crystallized in a mold on molding, the degree of shrinkage after molding is small.

The aromatic diamine compound of the present invention has at least excellent characteristics ⑤ to ⑥ described below.

⑤ The content of an azo compound is very small.

⑥ A polyimide resin having excellent thermal stability on melting can be obtained.

BACKGROUND ART a) Filed of the Invention

① Characteristics and application of polyimide

Polyimide has widely been used in the fields of molding materials, composite materials, electric/electronic parts, etc. because of its excellent characteristics such as mechanical properties, chemical resistance, flame retardance, electric characteristics, etc., including excellent heat resistance.

② "Vespel" (manufactured by Du Pont Co.) and "Upimol" (manufactured by Ube Industries, Ltd.)

As the polyimide for molding material and composite material, "Vespel" (trade name, manufactured by Du Pont Co.) and "Upimol" (trade name, manufactured by Ube Industries, Ltd.) are known, but both polyimides were inferior in moldability because they are insoluble and infusible. That is, to obtain a molded article of the polyimide, it was necessary to mold from polyamic acid as a polyimide precursor by using a special means such as sintering. The problem is that it is difficult to obtain a product having a complicated shape by sintering. To obtain the product having a complicated shape, a desired shape must be skived from a block by using a cutting machine such as NC lathe and the like. Therefore, there was a problem about the cost required to complicated machining and forming steps.

③ "Ultem" (manufactured by General Electric Co.)

As an injection-moldable thermoplastic polyimide having improved moldability, for example, "Ultem" (trade name, manufactured by General Electric Co.) is known (U.S. Pat. Nos. 3,847,867 and 3,847,869).

However, since this polyimide is completely non-crystalline and has a glass transition temperature (Tg) of 215° C., it has not sufficient heat resistance, necessarily, when assuming use at a high temperature range.

That is, when it is evaluated by a deflection temperature under load (DTUL) which indicates s substantial working limit of temperature, the temperature of neat "Ultem" is 200° C. and that of (CF30) "Ultem" containing 30% by weight of carbon fibers is 212° C. Therefore, when assuming use at a high temperature range, both of them are not a high numerical value as a super engineering plastic.

④ "AURUM" (manufactured by Mitsui Chemicals, Inc.)

As the injection-moldable thermoplastic polyimide having improved moldability, for example, "AURUM" (trade name, manufactured by Mitsui Chemicals, Inc.) was newly developed (Japanese Patent Laid-Open No. 62-68817).

This polyimide is superior in thermal stability on melting and is suitably applied to melt molding such as extrusion molding and injection molding. Regarding "AURUM", a melt viscosity ratio MVR calculated by the numerical formula (1) is within a numerical range shown in the numerical formula 2.

The glass transition temperature (Tg) of this polyimide is 245° C. and, when it is evaluated by the reflection temperature under load (DTUL), the temperature of neat "AURUM" is 238° C. and that of (CF30) "AURUM" containing 30% by weight of carbon fibers is 248° C. Therefore, "AURUM" is superior in heat resistance to "Ultem".

"AURUM" is essentially crystalline and can be crystallized by heat-treating (annealing treatment, annealing) after molding. Regarding DUTL of "AURUM" when it is crystallized, the temperature of neat "AURUM" is 260° C. and that of (CF30) "AURUM" containing 30% by weight of carbon fibers is 349° C. Therefore, "AURUM" has a markedly higher heat resistance than the case where it is not crystallized.

As described above, "AURUM" is crystalline and has high glass transition temperature and high melting point, and has highest heat resistance among thermoplastic resins. However, this polyimide is slowly crystallized, that is, it takes a long time to complete the crystallization is long. Furthermore, a molded article obtained by a general molding cycle, e.g. injection molding cycle of about 30 to 60 seconds, is amorphous.

Therefore, the molded article thus obtained has such a feature that it is superior in dimensional accuracy and flexural modulus as far as it is used at a temperature lower than the glass transition point.

On the other hand, when the molded article thus obtained is used under the conditions of a temperature higher than the glass transition point, the modulus is drastically lowered and the shape of the molded article can not be retained, thereby making it impossible to use it continuously.

When this molded article made of "AURUM" is continuously used under the conditions of a temperature higher than the glass transition point, the amorphous molded article may be crystallized by subjecting to a heat treatment. However, a heat-treating operation requiring a long time drastically lowers the productivity and, furthermore, shrinkage along with crystallization causes problems such as dimensional change, deformation, surface roughening and the like.

If the molded article obtained by molding "AURUM" is sufficiently crystallized without requiring a special heat treatment (e.g. slow cooling in mold, heat treatment after molding, etc.), these problems do not occur. Therefore, there has been developed a technique of accelerating the crystallization by adding to "AURUM" an organic low-molecular weight compound and a crystalline resin having low heat resistance (Japanese Patent Laid-Open Nos. 9-104756 and 9-188813).

However, these methods have such a problem that the heat and chemical resistances are lowered because the low-molecular weight compound and resin having low heat resistance are added.

⑤ Polyimide having a repeating unit represented by the chemical formula (1).

Polyimide having a repeating unit represented by the chemical formula (1) is disclosed in Japanese Patent Laid-Open Nos. 61-143433, 62-11727 and 63-172735, and crystallizability and fast crystallization are shown.

Accordingly, if this polyimide can be applied to injection molding and can be crystallized in a mold during a conventional molding cycle, it is assumed that the resulting molded article has high heat resistance and high dimensional accuracy.

However, since molecular terminal of the polyimide produced in accordance with such a disclosure is not deactivated, the thermal stability on melting is drastically low and the fluidity is lowered quickly within a short time. Therefore, it was not practical to apply the polyimide to melt molding such as extrusion molding, injection molding or the like.

⑥ Polyimide having a repeating unit represented by the chemical formula (1), molecular terminal of which is composed of the chemical formula (2) and/or chemical formula (3)

Macromolecules, Vol. 29, pages 135–142 (1996) and Macromolecules, Vol. 30, pages 1012–1022 (1997) disclose a technique of improving the thermal stability on melting of the polyimide by reacting the molecular terminal of the polyimide with an aromatic dicarboxylic anhydride to deactivate the molecular terminal. However, this disclosure shows that, even if the molecular terminal of the polyimide is deactivated, the melt viscosity increases by 1.65 times or higher as that of the initial viscosity on maintaining at 420° C. for 30 minutes.

It is known that, when the resin whose melt viscosity increases with a lapse of time is injection-molded under fixed molding conditions, the fluidity of the resin is lowered with a lapse of time after the beginning of the molding to cause a problem that the resin does not reach all of the corners of the mold and physical properties of the resulting product are not constant. Therefore, it had not been performed to apply the polyimide to injection molding.

Actually, as shown in the Comparative Examples of the present invention, the polyimide produced in accordance with such a disclosure showed an increase in viscosity on melting and could be applied to injection molding. However, it was impossible to produce a molded article having stable color tone and physical properties.

In the technical field of the polyimide, a crystalline polyimide for melt molding having not only excellent heat resistance and chemical resistance, which are peculiar to the polyimide, but also high crystallization rate have required. However, such a polyimide has still to be obtained at present.

That is, the problem is that a crystalline polyimide having a repeating unit represented by the chemical formula (1), a molecular terminal being composed of the chemical formula (2) and/or chemical formula (3) is inferior in thermal stability on melting and a melt viscosity ratio MVR calculated by the numerical formula (1) exceeds 1.5.

In the polyimide whose melt viscosity ratio MVR exceeds 1.5, the fluidity is lowered with a lapse of time on melting. Therefore, when the injection molding is conducted, the injection pressure was increased and the fluidity of the resin is lowered with a lapse of time after the beginning of the molding. Accordingly, not only stable molding could not be conducted, but also products having stable color tone and physical properties could not be obtained.

In light of the above problems in the prior art, the present inventors have decided it as an object to be attained by the present invention to provide a crystalline polyimide for melt molding, which has at least excellent characteristics ① to ④ described below.

Particularly, it was difficult to realize the characteristics ① described below by the prior art.

① It is superior in thermal stability on melting. That is, the degree of lowering of the fluidity with a lapse of time on melting is small. It was difficult to realize this feature in the prior art.

② It has high heat resistance. That is, it has excellent mechanical strength even at the temperature higher than a glass transition temperature (Tg) because of its high crystallizability.

③ It is superior in productivity. That is, since a crystallization rate is large, it is crystallized during a normal short molding cycle without requiring a special heat-treating operation such as operation of slowly cooling in a mold on molding, operation of heat-treating after molding or the like.

④ It is superior in dimensional accuracy. That is, since a crystallization rate is large and it is crystallized in a mold on molding, the degree of shrinkage after molding is small.

DISCLOSURE OF THE INVENTION

To solve the above problems, the present inventors have studied intensively. As a result, they have found that the resulting resin exerts markedly high thermal stability only when using 1,3-bis(4-aminophenoxy)benzene containing no azo compound as a raw material monomer and that stable melt molding can be conducted only when using this resin and the color tone and physical properties of the resulting product are stable. Thus, the present invention has been completed.

That is, a first invention of the present invention relates to a thermoplastic polyimide having good thermal stability, comprising a repeating unit represented by the chemical formula (1), a molecular terminal being composed of the chemical formula (2) and/or chemical formula (3), characterized in that:

a melt viscosity ratio MVR calculated by the numerical formula (1) is within a numerical range shown in the numerical formula (2).

A second invention of the present invention relates to 1,3-bis(4-aminophenoxy)benzene represented by the chemical formula (2), characterized in that the content of an azo compound is from 0.0 to 0.2%, which is used as a raw material of the above polymer.

In the prior art, it was not confirmed that an azo compound as an impurity is present in 1,3-bis(4-aminophenoxy)benzene obtained by a conventional method. Regarding the polyimide obtained by using 1,3-bis(4-aminophenoxy)benzene obtained by a conventional method, the melt viscosity ratio MVR calculated by the numerical formula (1) exceeded 1.5.

It has been bound for the first time by the present inventors that the melt viscosity ratio MVR calculated by the numerical formula (1) of the thermoplastic polyimide is related to the amount of the azo compound in 1,3-bis(4-aminophenoxy)benzene used as the raw material.

The thermoplastic polyimide according to the present invention is characterized in that it is superior in thermal stability on melting and is capable of performing stable melt molding and that the resulting molded article has stable color tone and stable physical properties.

The present invention is specified by the matters described in ① to ⑬ below.

① A thermoplastic polyimide having good thermal stability, comprising a repeating unit represented by the chemical formula (1), a molecular terminal being composed of the chemical formula (2) and/or chemical formula (3), characterized in that:

a melt viscosity ratio MVR calculated by the numerical formula (1) is within a numerical range shown in the numerical formula (2).

of the chemical formula (2) and/or chemical formula (3), characterized in that:

a melt index retention MIR calculated by the numerical formula (3) is within a numerical range shown in the numerical formula (4).

Numerical Formula 3

$$MIR = MI30/MI5 \qquad (3)$$

(in the numerical formula (3), MI5 is MI ([g/10 min.]) determined by melting a sample with maintaining at 420° C. for 5 minutes and measuring under a load of 10.3 N in accordance with ASTM D-1238 and MI30 is MI ([g/10 min.]) determined by melting a sample with maintaining at 420° C. for 30 minutes and measuring)

Numerical Formula 4

$$0.7 \leq MIR \leq 1.0 \qquad (4)$$

(in the numerical formula (4), MIR is a melt index retention calculated by the numerical formula (3))

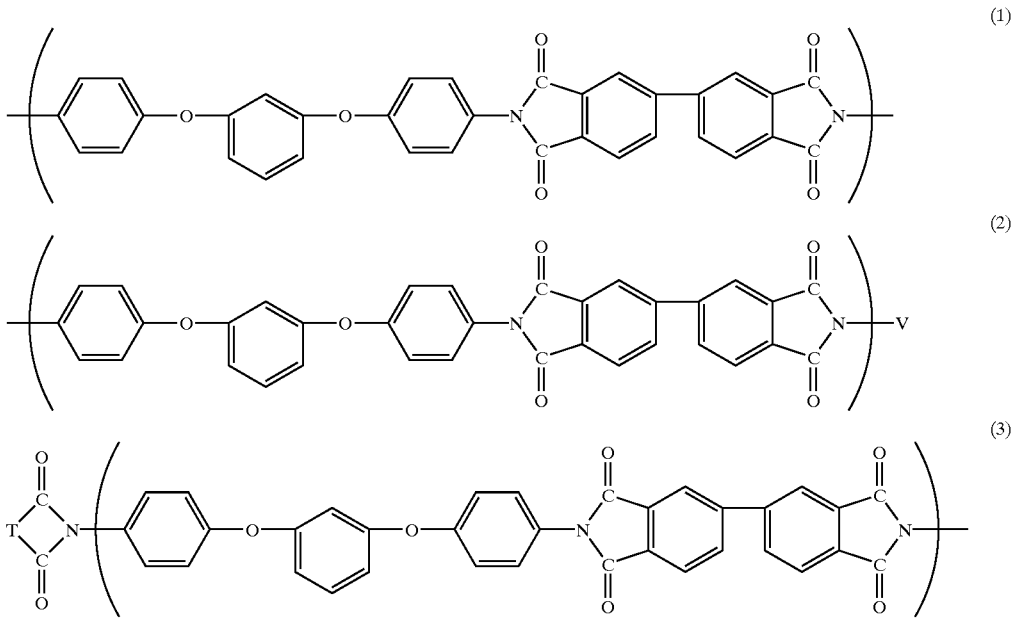

(in the chemical formula (2), V is a monovalent aromatic group and, in the chemical formula (3), T is a divalent aromatic group)

Numerical Formula 1

$$MVR = MV30/MV5 \qquad (1)$$

(in the numerical formula (1), MV5 is a melt viscosity ([Pa.sec]) determined by melting a sample with maintaining at 420° C. for 5 minutes and measuring at a shear rate within a range from 30 to 500 [sec$^{-1}$], and MV30 is a melt viscosity ([Pa.sec]) determined by melting a sample with maintaining at 420° C. for 30 minutes and measuring at a shear rate within a range from 30 to 500 [sec$^{-1}$])

Numerical Formula 2

$$1.0 \leq MVR \leq 1.5 \qquad (2)$$

(in the numerical formula (2), MVR is a melt viscosity ratio calculated by the numerical formula (1))

② A thermoplastic polyimide having good thermal stability, comprising a repeating unit represented by the chemical formula (1), a molecular terminal being composed ③ 1,3-bis(4-aminophenoxy)benzene represented by the chemical formula (4), characterized in that the content of an azo compound is from 0.0 to 0.2%.

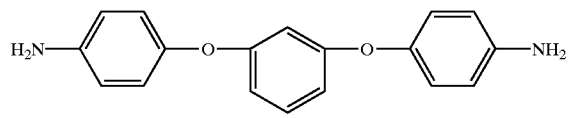

④ 1,3-bis(4-aminophenoxy)benzene according to ③, wherein the azo compound is at least one selected from the group consisting of compounds represented by the chemical formulas (5) to (7).

(5)

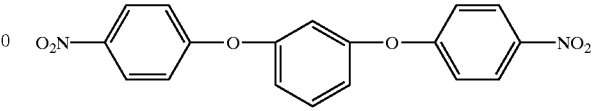

(6)

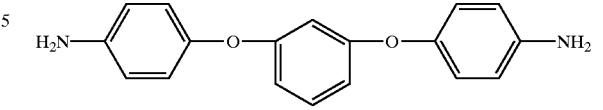

(7)

(5) 1,3-bis(4-aminophenoxy)benzene according to (3) or (5), which is used for production of a thermoplastic polyimide resin having good thermal stability.

(6) A method for producing a thermoplastic polyimide having good thermal stability, which comprises using 1,3-bis(4-aminophenoxy)benzene represented by the chemical formula (8), 3,3',4,4'-biphenyltetracarboxylic anhydride represented by the chemical formula (9), monoamine represented by the chemical formula (10) and/or dicarboxylic anhydride represented by the chemical formula (11), characterized in that:

the content of an azo compound of 1,3-bis(4-aminophneoxy)benzene represented by the chemical formula (8) is from 0.0 to 0.2%.

(8)

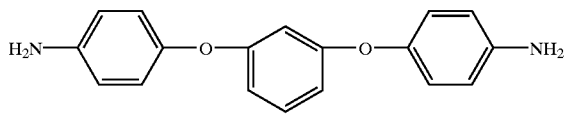

(9)

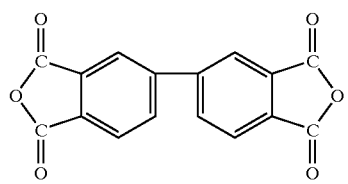

(10)

H$_2$N—V (11)

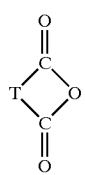

(in the chemical formula (10), V is a monovalent aromatic group and, in the chemical formula (11), T is a divalent aromatic group)

(7) The method for producing a thermoplastic polyimide having good thermal stability according to (6), wherein the azo compound is at least one selected from the group consisting of compounds represented by the chemical formulas (5) to (7).

(8) A thermoplastic polyimide having good thermal stability obtained by the method of (6) or (7).

(9) A method for producing 1,3-bis(4-aminophenoxy)benzene represented by the chemical formula (13), which comprises previously charging a reaction solvent and a catalyst and then reducing 1,3-bis(4-nitrophenoxy)benzene represented by the chemical formula (12) with gradually adding said 1,3-bis(4-nitrophenoxy)benzene in a reaction vessel in which hydrogen is introduced, characterized in that:

the content of an azo compound is from 0.0 to 0.2%.

(12)

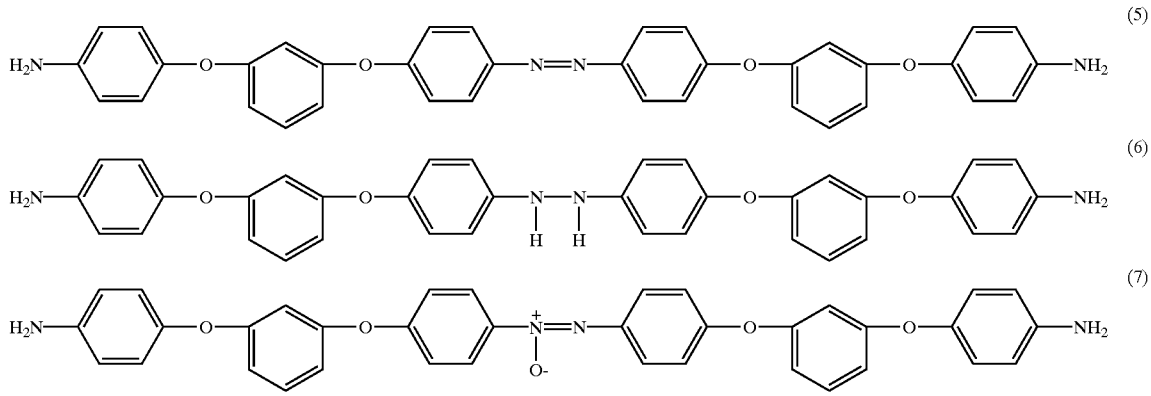

(13)

(10) The method for producing a thermoplastic polyimide having good thermal stability according to (9), wherein the azo compound is at least one selected from the group consisting of compounds represented by the chemical formulas (5) to (7).

(11) 1,3-bis(4-aminophenoxy)benzene represented by the chemical formula 13 wherein the content of an azo compound is from 0.0 to 0.2%, which is obtained by the method of (9) or (10).

(12) A molded article comprising a thermoplastic polyimide having a repeating unit represented by the chemical formula (1), a molecular terminal being composed of the chemical formula (2) and/or chemical formula (3), characterized in that:

when the molded article is molten, a melt viscosity ratio MVR calculated by the numerical formula (1) is within a numerical range shown in the numerical formula (2).

Numerical Formula 1

$$MVR = MV30/MV5 \qquad (1)$$

(in the numerical formula (1), MV5 is a melt viscosity ([Pa.sec]) determined by melting a sample with maintaining at 420° C. for 5 minutes and measuring at a shear rate within a range from 30 to 500 [sec$^{-1}$], and MV30 is a melt viscosity ([Pa.sec]) determined by melting a sample with maintaining at 420° C. for 30 minutes and measuring at a shear rate within a range from 30 to 500 [sec$^{-1}$])

Numerical Formula 2

$$1.0 \leq MVR \leq 1.5 \quad (2)$$

(in the numerical formula (2), MVR is a melt viscosity ratio calculated by the numerical formula (1))

(13) A molded article comprising a thermoplastic polyimide having a repeating unit represented by the chemical formula (1), a molecular terminal being composed of the chemical formula (2) and/or chemical formula (3), characterized in that:

when the molded article is molten, a melt index retention MIR calculated by the numerical formula (3) is within a numerical range shown in the numerical formula (4) [Numerical Formula 4].

Numerical Formula 3

$$MIR = MI30/MI5 \quad (3)$$

(in the numerical formula (3), MI5 is MI ([g/10 min.]) determined by melting a sample with maintaining at 420° C. for 5 minutes and measuring under a load of 10.3 N in accordance with ASTM D-1238 and MI30 is MI ([g/10 min.]) determined by melting a sample with maintaining at 420° C. for 30 minutes and measuring)

Numerical Formula 4

$$0.7 \leq MIR \leq 1.0 \quad (4)$$

(in the numerical formula (4), MIR is a melt index retention calculated by the numerical formula (3))

Figure 1:
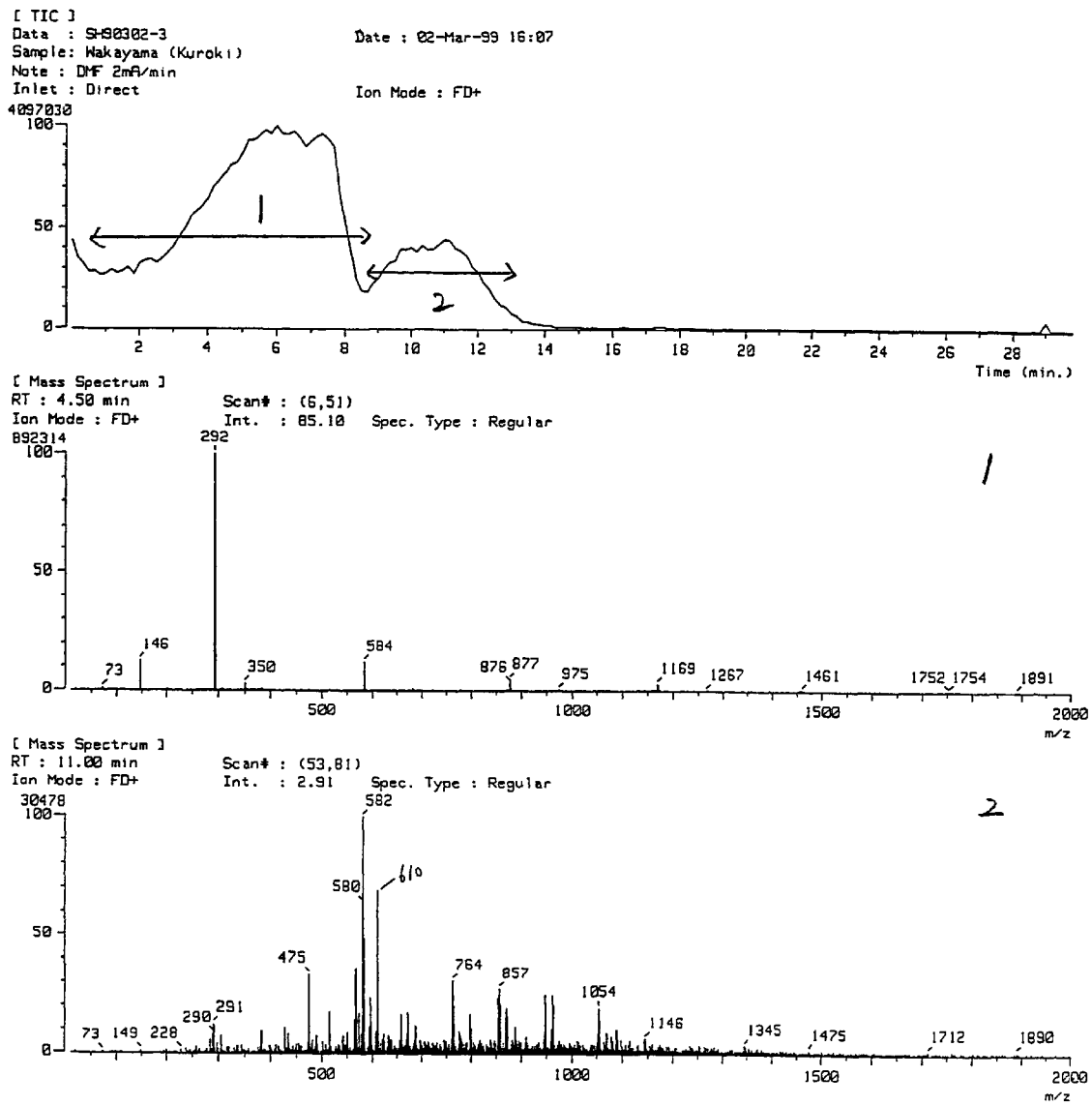
FIG. 1 is a graph showing a FD-MS spectrum of 1,3-bis (4-aminophenoxy)benzene of Comparative Example 4.

BEST MODE FOR CARRYING OUT 1,3-bis(4-aminophenoxy)benzene:

1,3-bis(4-aminophenoxy)benzene according to the present invention is 1,3-bis(4-aminophenoxy)benzene represented by the chemical formula (4), characterized in that the content of an azo compound is from 0.0 to 0.2%, and preferably from 0.0 to 0.1%. When the content of the azo compound is larger than 0.2%, the viscosity of the resulting polyimide increases with a lapse of time on melting so that the moldability and the stability of physical properties of the resulting product are drastically lowered, which is not preferred.

The content of the azo compound in 1,3-bis(4-aminophenoxy)benzene is quantitatively determined by gel permeation chromatography or FD-MS.

1,3-bis(4-aminophenoxy)benzene is industrially produced and is commercially available from Wakayama Seika Company (agency in U.S.A.: KEN-Seika Co.), Du Pont Co and various reagent manufacturers. However, 1,3-bis(4-aminophenoxy)benzene can not be used as a raw material for polyimide of the present invention because it contains the azo compound in the amount as much as 0.5% or higher.

1,3-bis(4-aminophenoxy)benzene is usually produced by reacting resorcin with p-nitrochlorobenzene in an aprotic polar solvent in the presence of a base, and reducing the resulting 1,3-bis(4-nitrophenoxy)benzene with hydrogen.

The present inventors have found that an azo compound as an impurity is present in 1,3-bis(4-aminophenoxy) benzene produced by this method. Not only it is difficult to remove this impurity by a normal purification method such as hydrochloride recrystallization method because its chemical properties are markedly close to those of 1,3-bis(4-aminophenoxy)benzene, but also it is difficult to separate it from 1,3-bis(4-aminophenoxy)benzene even if a silica gel column or a reverse phase column having an octadecyl group is used. Therefore, it was not recognized in the prior art that the azo compound as the impurity is present in 1,3-bis(4-aminophenoxy)benzene obtained by a conventional method.

That is, it is a knowledge found for the first time by the present inventors that the azo compound is present in 1,3-bis(4-aminophenoxy)benzene. Furthermore, the present inventors could have obtained 1,3-bis(4-aminophenoxy) benzene containing no azo compound for the first time as a result of an intensive study about the method for purification of 1,3-bis(4-aminophenoxy)benzene and method for production of 1,3-bis(4-aminophenoxy)benzene on the basis of the above consideration. Also the present inventors have studied intensively about the content of the azo compound in 1,3-bis(4-aminophenoxy)benzene and physical properties of the resulting polyimide. As a result, they have found that the thermal stability of the resulting polyimide is markedly good, specifically, only when using 1,3-bis(4-aminophenoxy)benzene whose content of the azo compound is from 0.0 to 0.2%.

Japanese Patent Laid-Open No. 4-69369 discloses that an azo compound is present in 1,3-bis(4-aminophenoxy) benzene. However, there was not a disclosure about the azo compound in a bis(4-aminophenoxy) compound such as 1,3-bis(4-aminophenoxy)benzene, and it was not found that a trace amount such as about 0.5% of the azo compound drastically lowers the melt thermal stability of the resulting resin.

Azo compound:

The azo compound in 1,3-bis(4-aminophenoxy)benzene in the present invention refers to at least one selected from the group consisting of compounds represented by the chemical formulas (5) to (7).

It is assumed that the above azo compound is incorporated into a molecular chain of the polyimide by reacting in the production of the polyimide in the same manner as in a normal aromatic diamino compound because the azo compound has two amino groups. It is assumed that the azo compound incorporated into the molecular chain forms a radical, an amino group or the like on melt molding of the resin, thereby causing crosslinking of the molecular chain.

The above azo compound is formed on reduction of 1,3-bis(4-nitrophenoxy)benzene with hydrogen in the production process of 1,3-bis(4-aminophenoxy)benzene. Specifically, it is formed by condensing a nitroso compound, hydroxylamine, etc. as a reduction intermediate of a nitro compound on reduction reaction. In the present invention, the azo compound includes not only a compound having an azo group formed in the condensation reaction on reduction described above, but also a compound having a hydrazo group as a reduction substance of the compound and a compound having an azoxy group as an oxide of the compound.

Not only it is difficult to remove the azo compound by a normal purification method such as hydrochloride recrystallization method because its chemical properties are markedly close to those of 1,3-bis(4-aminophenoxy)benzene, but also it is difficult to separate it from 1,3-bis(4-aminophenoxy)benzene even if a silica gel column or a reverse phase column having an octadecyl group is used. Therefore, it was not recognized in the prior art that the azo compound as the impurity is present in 1,3-bis(4-aminophenoxy)benzene obtained by a conventional method.

That is, it is a knowledge found for the first time by the present inventors that the azo compound is present in 1,3-bis(4-aminophenoxy)benzene. Furthermore, the present inventors could have obtained 1,3-bis(4-aminophenoxy)benzene containing no azo compound for the first time as a result of an intensive study about the method for purification of 1,3-bis(4-aminophenoxy)benzene and method for production of 1,3-bis(4-aminophenoxy)benzene on the basis of the above consideration. The present inventors have studied intensively about the content of the azo compound in 1,3-bis(4-aminophenoxy)benzene and physical properties of the resulting polyimide. As a result, they have found that the thermal stability of the resulting polyimide is markedly good, specifically, only when using 1,3-bis(4-aminophenoxy)benzene whose content of the azo compound is from 0.0 to 0.2%.

Method for production of 1,3-bis(4-aminophenoxy)benzene whose content of the azo compound is from 0.0 to 0.2%:

1,3-bis(4-aminophenoxy)benzene whose content of the azo compound is from 0.0 to 0.2% according to the present invention can be produced by previously charging a reaction solvent and a catalyst, and catalytically reducing 1,3-bis(4-nitrophenoxy)benzene with adding 1,3-bis(4-nitrophenoxy)benzene represented by the chemical formula (12) in a reaction vessel in which hydrogen is introduced.

It is possible to markedly inhibit the concentration of a nitroso compound and a hydroxylamine compound, as a reduction intermediate from a nitro compound to an amino compound, in the reaction system by previously charging a reaction solvent and a catalyst, and catalytically reducing 1,3-bis(4-nitrophenoxy)benzene with adding 1,3-bis(4-nitrophenoxy)benzene in a reaction vessel in which hydrogen is introduced. As a result, the azo compound formed by the condensation of the nitroso compound, hydroxylamine compound or the like can be inhibited.

1,3-bis(4-aminophenoxy)benzene whose content of the azo compound is from 0.0 to 0.2% according to the present invention can also be obtained by distillation/purification of 1,3-bis(4-aminophenoxy)benzene containing the azo compound obtained by a conventional method. The distillation/purification may be not only precision distillation or molecular distillation using a distillation column, but also simple evaporation distillation using a thin film evaporator as far as a high-boiling impurity can be removed. However, distillation of 1,3-bis(4-aminophenoxy)benzene must be conducted at high temperature under high vacuum, e.g. 240° C. under 13.3 Pa or 270° C. under 40 Pa and it is industrially difficult.

Preferred process for production of 1,3-bis(4-aminophenoxy)benzene:

Preferred process for production of 1,3-bis(4-aminophenoxy)benzene according to the present invention will be shown below.

A solution wherein 13-bis(4-nitrophenoxy)benzene is dissolved in a reaction solvent for reduction reaction is prepared.

In a reaction vessel-equipped with a hydrogen gas introducing apparatus, an evacuation apparatus, a dropping apparatus, a mercury sealing type stirrer and a thermometer, a reduction catalyst and a predetermined amount of a areaction solvent are charged. After replacing the atmosphere in the reaction system by a hydrogen gas, the reaction solution is heated to a predetermined temperature with stirring.

After heating, the dropwise addition of a 1,3-bis(4-nitrophenoxy)benzene solution using the dropping apparatus is initiated at a predetermined dropping rate. During the dropwise addition, the hydrogen gas is added properly to a hydrogen gas reservoir in accordance with the degree of hydrogen absorption due to the reaction. Thirty minutes to one hour after the termination of the hydrogen absorption, stirring is continued.

After the completion of the reaction, the atmosphere in the reaction system is replaced by a nitrogen gas and the reaction solution was filtered to separate the catalyst from the reaction solution. Then, water is added to this filtrate to deposit a crystal.

The deposit is isolated by filtration to obtain the desired 1,3-bis(4-aminophenoxy)benzene.

The reducing catalyst used in the catalytic reduction is not specifically limited, and there can be used metal catalysts used generally in the catalytic reduction, for example, nickel, palladium, platinum, rhodium, ruthenium, cobalt, copper and the like. These catalysts can be used in the state of a metal, but can also be used after supporting it with a carrier such as carbon, barium sulfate, silica gel, alumina, celite or the like. Nickel, cobalt and copper are also used as Raney catalyst. The amount of the catalyst is not specifically limited, but is usually from 0.01 to 10% by weight in terms of metal based on the bis(4-nitrophenoxy) compound.

The solvent for reduction reaction is not specifically limited as far as it is inherent to the reaction. For example, there can be used alcohols such as methanol, ethanol, isopropanol, etc.; glycols such as ethylene glycol, propylene glycol, etc.; ethers such as ether, dioxane, tetrahydrofuran, methylcellosolve, etc.; aliphatic hydrocarbons such as hexane, cyclohexane, etc.; aromatic hydrocarbons such as benzene, toluene, xylene, etc.; esters such as ethyl acetate, butyl acetate, etc.; and N,N-dimethylformamide. It is industrially preferred to use the same solvent in the condensation reaction and reduction reaction.

The total amount of the solvent on reduction reaction is not specifically limited, and is usually from 0.5 to 10 parts by weight per part of 1,3-bis(4-nitrophenoxy)benzene. When using a reaction solvent which is not miscible with water, the reaction can also be accelerated by adding a phase transfer catalyst used generally, such as quaternary alkyl ammonium salt, quaternary alkyl phosphonium salt or the like.

The reaction temperature on reduction reaction is not specifically limited, but the reaction can be carried out usually at about 50 to 100° C. Also the hydrogen pressure during the reaction is not specifically limited, and the reaction can be carried out under a small pressure ranging from a normal pressure (atmospheric pressure) to about 0.2 MPa. Furthermore, when the reaction rate is increased, the reaction can also be conducted under a pressure of about 5 MPa.

In the case of carrying out the reduction reaction, a reaction solvent and a catalyst are previously charged and then the reaction is conducted while 1,3-bis(4-nitrophenoxy)benzene is slowly added in the reaction system wherein the atmosphere is replaced by a hydrogen gas with stirring. The aspect in the case of adding 1,3-bis(4-nitrophenoxy)benzene is not specifically limited, but a method of adding dropwise a solution prepared by dissolving 1,3-bis(4-nitrophenoxy)benzene in a reaction solvent is easy in view of the operation and is a preferred aspect.

Regarding the rate of adding 1,3-bis(4-nitrophenoxy)benzene on reduction reaction, it is necessary to add it to the system in the amount suited for reaction rate. When the addition rate is too large, the concentration of nitroso and hydroxylamine in the system can not be sufficiently controlled and the azo compound as a by-product can not be inhibited from forming. The optimum addition rate varies depending on the conditions of the reduction reaction, but the total amount is preferably added over 2 hours or more when the reduction reaction is conducted at the reaction temperature of 90° C. under a small pressure ranging from a normal pressure to about 0.2 MPa.

After the completion of the reduction reaction, 1,3-bis(4-aminophenoxy)benzene can be deposited by removing the catalyst from the reaction solution by filtration and adding a poor solvent such as water to the filtrate. 1,3-bis(4-aminophenoxy)benzene recovered by filtration has high purity as it is, but can be further subjected to recrystallization or an activated carbon treatment.

Crystalline polyimide for melt molding having excellent thermal stability on melting according to the present invention:

The polyimide according to the present invention is a thermoplastic polyimide having good thermal stability, comprising a repeating unit represented by the chemical formula (1), a molecular terminal being composed of the chemical formula (2) and/or chemical formula (3) (in the chemical formula (2), V is a monovalent aromatic group and, in the chemical formula (3), T is a divalent aromatic group), characterized in that:

a melt viscosity ratio MVR calculated by the numerical formula (1) is within a numerical range shown in the numerical formula (2).

Numerical Formula 1

$$MVR = MV30/MV5 \quad (1)$$

(in the numerical formula (1), MV5 is a melt viscosity ([Pa.sec]) determined by melting a sample with maintaining at 420° C. for 5 minutes and measuring at a shear rate within a range from 30 to 500 [sec$^{-1}$], and MV30 is a melt viscosity ([Pa.sec]) determined by melting a sample with maintaining at 420° C. for 30 minutes and measuring at a shear rate within a range from 30 to 500 [sec$^{-1}$])

Numerical Formula 2

$$1.0 \leq MVR \leq 1.5 \quad (2)$$

(in the numerical formula (2), MVR is a melt viscosity ratio calculated by the numerical formula (1));

and/or a thermoplastic polyimide, characterized in that:

a melt flow index retention MIR calculated by the numerical formula (3) is within a numerical range shown in the numerical formula (4).

Numerical Formula 3

$$MIR = MI30/MI5 \quad (3)$$

(in the numerical formula (3), MI5 is MI ([g/10 min.]) determined by melting a sample with maintaining at 420° C. for 5 minutes and measuring under a load of 10.3 N in accordance with ASTM D-1238 and MI30 is MI ([g/10 min.]) determined by melting a sample with maintaining at 420° C. for 30 minutes and measuring)

Numerical Formula 4

$$0.7 \leq MIR \leq 1.0 \quad (4)$$

(in the numerical formula (4), MIR is a melt index retention calculated by the numerical formula (3))

Polyimide having a repeating unit represented by chemical formula (1):

The polyimide according to the present invention is a thermoplastic polyimide having a repeating unit represented by the chemical formula (1). It has been well known heretofore that the polyimide having a repeating unit represented by the chemical formula (1) exhibits thermoplasticity and crystallizability.

The polyimide according to the present invention has a repeating unit represented by the chemical formula (1), but may have a repeating unit different from that represented by the chemical formula (1) as far as good physical properties are adversely affected. Specific examples of the different repeating unit include a repeating unit represented by the general formula (a).

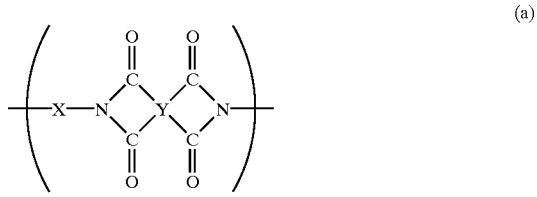

(wherein X represents a divalent aromatic group and Y represents a tetravalent aromatic group, and specific examples of X include (e) to (h) described below and specific examples of Y include (r) to (x) described below)

Specific examples of the divalent aromatic group X

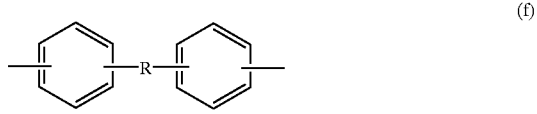

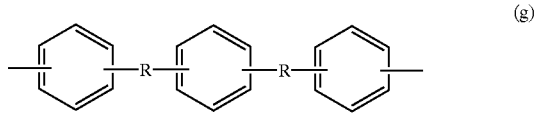

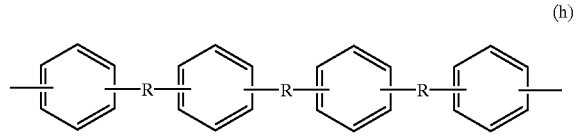

Specific examples of the tetravalent aromatic group Y

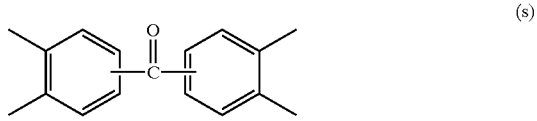

-continued

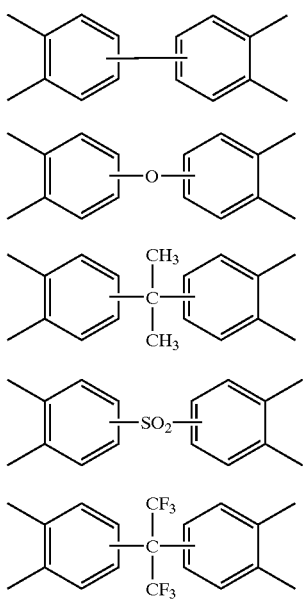

(wherein R each independently is represented by at least one selected from the group consisting of the formulas (i) to (q).)

(i) —

(j) —O—

(k) —CO—

(l) —SO$_2$—

(m) —S—

(n) —CH$_2$—

(o) —C(CH$_3$)$_2$—

(p) —C(CF$_3$)$_2$—

(q) 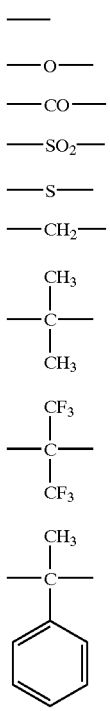

Hydrogen atoms of aromatic rings represented by the general formula (a) may also be substituted with a substituent having no reactivity with an amino group and a carbonyl group. Specific examples of such a substituent of the hydrogen atom of the aromatic ring include those represented by the chemical formulas (19) to (33).

Substituent of hydrogen atom

(19) —F

(20) —Cl

(21) —Br

(22) —CH$_3$

(23) —C$_2$H$_5$

(24) —C$_3$H$_7$

(25) —C$_4$H$_9$

(26) —CF$_3$

(27) —C$_6$H$_5$ (phenyl)

(28) —O—C$_6$H$_5$

(29) —CO—C$_6$H$_5$

(30) —SO$_2$—C$_6$H$_5$

(31) —S—C$_6$H$_5$

(32) —C(CH$_3$)$_2$—C$_6$H$_5$

(33) —C(CF$_3$)$_2$—C$_6$H$_5$

An amount of the different repeating unit is preferably within a range from 0 to 10% by mol based the repeating unit represented by the chemical formula (1). When the amount of the different repeating unit exceeds 10% by mol, the crystallization rate of the polyimide is drastically lowered and it becomes difficult to crystallize it in the mold on injection molding.

Polyimide whose molecular terminal is composed of the chemical formula (2) and/or chemical formula (3):

The polyimide according to the present invention is a polyimide whose molecular terminal is composed of the chemical formula (2) and/or chemical formula (3). It has been well known heretofore that the thermal stability of the polyimide on melting is improved by composing the molecular terminal of the polyimide having the repeating unit represented by the chemical formula (1) of a structure represented by the chemical formula (2) and/or chemical formula (3).

In the polyimide according to the present invention, specific examples of the monovalent aromatic group V in the chemical formula (2) include (14) to (15) below.

V (14)

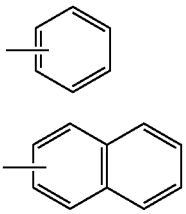

(15)

Herein, hydrogen atom of aromatic ring of the monovalent aromatic radical V may also be substituted with a substituent having no reactivity with an amino group and a carbonyl group. Specific examples of such a substituent of the hydrogen atom of the aromatic ring include those represented by the chemical formula (19)–(33).

In the polyimide according to the present invention, specific examples of the divalent aromatic group T in the chemical formula (3) include (16) to (18) below.

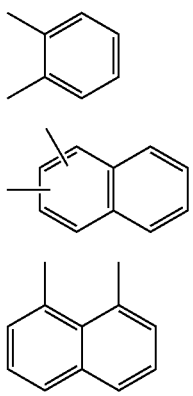

(16)

(17)

(18)

Herein, hydrogen atom of aromatic ring of the divalent aromatic radical T may also be substituted with a substituent having no reactivity with an amino group and a carbonyl group. Specific examples of such a substituent of the hydrogen atom of the aromatic ring include those represented by the chemical formula (19)–(33).

In the polyimide according to the present invention, the molecular terminal preferably has a structure represented by the chemical formula (b).

Molecular weight of polyimide:

The molecular weight of the polyimide can be evaluated by the inherent viscosity and melt viscosity.

The inherent viscosity η inh [dl/g] of the polyimide according to the present invention is not specifically limited, but is preferably from 0.6 to 1.3 [dl/g], and more preferably from 0.8 to 1.2 [dl/g].

The inherent viscosity η inh [dl/g] is an inherent viscosity determined by dissolving a sample (0.5% by weight) in a mixed solvent of 90% by weight of p-chlorophenol and 10% by weight of phenol, and measuring at 35° C.

The melt viscosity MV5 [Pa.sec] of the polyimide according to the present invention is not specifically limited, but is preferably from $2\times10^2$ to $5\times10^3$ [Pa.sec], and more preferably from $4\times10^2$ to $3\times10^3$ [Pa.sec].

The melt viscosity MV5 [Pa.sec] is a melt viscosity determined by melting a sample with maintaining at 420° C. for 5 minutes and measuring at a shear rate within a range from 30 to 500 [$sec^{-1}$].

Inherent viscosity η inh:

In the polyimide according to the present invention, the inherent viscosity η inh [dl/g] is not specifically limited, but is preferably from 0.6 to 1.3 [dl/g], and more preferably from 0.8 to 1.2 [dl/g]. The inherent viscosity η inh [dl/g] is an inherent viscosity determined by dissolving a sample (0.5% by weight) in a mixed solvent of 90% by weight of p-chlorophenol and 10% by weight of phenol and measuring at 35° C.

When the inherent viscosity η inh [dl/g] is smaller than 0.6 [dl/g], the polyimide is very brittle and it is a difficult to use as a molded article. On the other hand, when the inherent viscosity η inh [dl/g] exceeds 1.3 [dl/g], the melt fluidity of the polyimide is very low and, therefore, it is difficult to conduct injection molding.

Melt viscosity KV5:

In the polyimide according to the present invention, the melt viscosity MV5 [Pa.sec] is not specifically limited, but is preferably from $2\times10^2$ to $5\times10^3$ [Pa.sec], and more preferably from $4\times10^2$ to $3\times10^3$ [Pa.sec].

The melt viscosity MV5 [Pa.sec] is a melt viscosity determined by melting a sample with maintaining at 420° C. for 5 minutes and measuring at a shear rate within a range from 30 to 500 [$sec^{-1}$]. When the melt viscosity MV5 is smaller than 200 [Pa.sec], the polyimide is very brittle and it is difficult to use as a molded article. On the other hand, when melt viscosity MV5 exceeds 5000 [Pa.sec], the melt fluidity of the polyimide is very low and, therefore, it is difficult to conduct injection molding.

Melt viscosity ratio MVR:

In the polyimide according to the present invention, a melt viscosity ratio MVR calculated by the numerical formula (1) is within a numerical range shown in the numerical formula (2), that is, it is within a range from 1.0 to 1.5, and preferably from 1.0 to 1.3, and more preferably from 1.0 to 1.2.

Numerical Formula 1

$$MVR = MV30/MV5 \qquad (1)$$

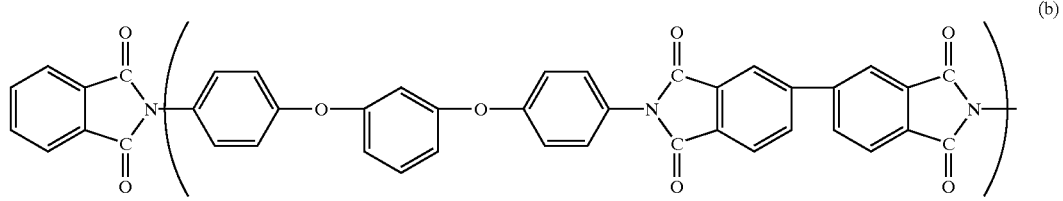

(b)

Numerical Formula 2

$$1.0 \leq MVR \leq 1.5 \qquad (2)$$

In the numerical formula (1), MV5 is a melt viscosity ([Pa.sec]) determined by melting a sample with maintaining at 420° C. for 5 minutes and measuring at a shear rate within a range from 30 to 500 [$sec^{-1}$], and MV30 is a melt viscosity ([Pa.sec]) determined by melting a sample with maintaining at 420° C. for 30 minutes and measuring at a shear rate within a range from 30 to 500 [sec$^{-1}$]).

The melt viscosity ratio MVR is a ratio wherein MV30 is divided by MV5, and is an index showing the degree of a change in melt viscosity with a lapse of time when the resin is maintained in a molten state.

When the decomposition of the resin occurs in the case of maintaining in the molten state, the molecular weight of the resin is lowered. Therefore, the melt viscosity ratio MVR becomes a numerical value of smaller than 1.0.

When the crosslinking of the resin occurs in the case of maintaining in the molten state, the molecular weight of the resin is increased. Therefore, the melt viscosity ratio becomes a numerical value of larger than 1.0, and generally a numerical value of larger than 1.5.

That is, as this melt viscosity ratio MVR approaches 1.0, the thermal stability on melting becomes better.

The thermal stability on melting refers to a property wherein the molecular weight is hardly lowered and the molecular weight is hardly increased when the resin is maintained in the molten state.

The polyimide according to the present invention has a feature that the melt viscosity ratio NVR is from 1.0 to 1.5, as shown in the numerical formula (2).

The polyimide having a feature of being markedly superior in thermal stability can be specifically obtained only when using the method for production of the polyimide according to the present invention.

That is, the thermoplastic polyimide having a repeating unit represented by the chemical formula (1), a molecular terminal being composed of the chemical formula (2) and/or chemical formula (3), which is obtained by the prior art, is inferior in thermal stability on melting, and the melt viscosity ratio MVR calculated by the numerical formula (1) exceeds 1.5.

Regarding the polyimide whose melt viscosity ratio MVR exceeds 1.5, the fluidity is lowered with a lapse of time on melting. Therefore, at the time of injection molding, the injection pressure is increased with a lapse of time after the beginning of the molding and the fluidity of the resin is lowered. Therefore, not only stable molding can not be conducted, but also a product having stable color tone and stable physical properties can not be obtained.

Melt flow index MI5:

In the polyimide according to the present invention, the melt flow index MI5 [g/10 min.] is not specifically limited, but is preferably from 0.2 to 100 [g/100 min.], and more preferably from 1.0 to 30 [g/100 min.].

The melt flow index MI5 is an index of the melt fluidity of the resin and is a value determined by melting a sample with maintaining at 420° C. for 5 minutes and measuring under a load of 10.3 N in accordance with ASTM D-1238.

When MI5 is smaller than 0.2 [g/100 min.], the melt fluidity of the polyimide is very low and, therefore, it is difficult to conduct injection molding. On the other hand, when MI5 exceeds 100 [g/100 min.], the polyimide is very brittle and it is difficult to use as a molded article.

Melt flow index retention MIR:

In the polyimide according to the present invention, the melt flow index retention MIR calculated by the numerical formula (3) is within a range represented by the numerical formula (4), that is, a range represented by the numerical formula (3), and is preferably within a range from 0.7 to 1.0, and more preferably from 0.9 to 1.0.

Numerical Formula 3

$$MIR = MI30/MI5 \tag{3}$$

Numerical Formula 4

$$0.7 \leq MIR \leq 1.0 \tag{4}$$

In the numerical formula (3), MI5 is MI ([g/10 min.]) determined by melting a sample with maintaining at 420° C. for 5 minutes and measuring under a load of 10.3 N in accordance with ASTM D-1238 and MI30 is MI ([g/10 min.]) determined by melting a sample with maintaining at 420° C. for 30 minutes and measuring.

The melt flow index retention MIR is a ratio wherein MI30 is divided by MI5, and is an index showing the degree of a change in melt viscosity with a lapse of time when the resin is maintained in a molten state.

When the decomposition of the resin occurs in the case of maintaining in the molten state, the molecular weight of the resin is lowered and it becomes easy to flow. Therefore, MIR becomes a numerical value of larger than 1.0.

When the crosslinking of the resin occurs in the case of maintaining in the molten state, the molecular weight of the resin is increased and the fluidity is lowered. Therefore, MIR becomes a numerical value of smaller than 1.0, and generally a numerical value of smaller than 0.7.

That is, as this melt flow index retention MIR approaches 1.0, the thermal stability on melting becomes better.

The thermal stability on melting refers to a property wherein the molecular weight is hardly lowered and the molecular weight is hardly increased when the resin is maintained in the molten state.

The polyimide according to the present invention has a feature that the melt flow index retention MIR is from 0.7 to 1.0, as shown in the numerical formula (4).

The polyimide having a feature of being markedly superior in thermal stability can be specifically obtained only when using the method for production of the polyimide according to the present invention.

That is, the thermoplastic polyimide having a repeating unit represented by the chemical formula (1), a molecular terminal being composed of the chemical formula (2) and/or chemical formula (3), which is obtained by the prior art, is inferior in thermal stability on melting, and MIR calculated by the numerical formula (3) is smaller than 0.7.

Regarding the polyimide whose MIR is smaller than 0.7, the fluidity is lowered with a lapse of time on melting. Therefore, at the time of injection molding, the injection pressure is increased with a lapse of time after the beginning of the molding and the fluidity of the resin is lowered. Therefore, not only stable molding can not be conducted, but also a product having stable color tone and stable physical properties can not be obtained.

Crystallizability of polyimide according to the present invention:

The polyimide according to the present invention has such a function that crystallization occurs when cooling from 430° C. in a molten state to 50° C. in a solid state at a cooling rate of 50° C./min.

In the case of the resin crystallized under such a cooling condition, that is, the resin having a large crystallization rate, a sufficiently crystallized molded article can be obtained even by melt molding due to a normal molding cycle.

On the other hand, in the case of the resin which can not be crystallized when cooling from 430° C. in a molten state to 50° C. in a solid state at a cooling rate of 50° C./min., a sufficiently crystallized molded article can not be obtained by melt molding due to a normal molding cycle. Therefore, an operation of a crystallization treatment of cooling in a mold on molding and an operation of crystallizing an amorphous molded article obtained by melt molding due to a normal molding cycle by a heat treatment (annealing treatment, annealing) are required and, therefore, the productivity is drastically lowered. The crystallization can be confirmed by the presence of a peak of heat generation accompanied by crystallization caused when the sample in the molten state is cooled at a cooling rate of 50 [° C./min.], which is measured by DSC (differential scanning calorimeter).

Method for production of thermoplastic polyimide having good thermal stability according to the present invention:

The method for production of thermoplastic polyimide having good thermal stability according to the present invention is a method for producing a thermoplastic polyimide having good thermal stability, which comprises using 1,3-bis(4-aminophenoxy)benzene represented by the chemical formula (8), 3,3',4,4'-biphenyltetracarboxylic dianhydride represented by the chemical formula (9), monoamine represented by the chemical formula (10) and/or dicarboxylic anhydride represented by the chemical formula (11), characterized in that:

the content of an azo compound of 13-bis(4-aminophneoxy)benzene represented by the chemical formula (8) is from 0.0 to 0.2%.

(in the chemical formula (10), V is a monovalent aromatic group and, in the chemical formula (11), T is a divalent aromatic group)

1,3-bis(4-aminophenoxy)benzene represented by the chemical formula (8):

In the method for production of the polyimide according to the present invention, the diamine represented by the chemical formula (8) is 1,3-bis(4-aminophenoxy)benzene according to the present invention, wherein the content of an azo compound is from 0.0 to 0.2%, and preferably from 0.0 to 0.1%. When the content-of the azo compound is larger than 0.2%, the viscosity of the resulting polyimide is changed with a lapse of time on melting and the moldability and the stability of physical properties of the resulting product are drastically lowered, which is not preferred.

In the present invention, the amount of 1,3-bis(4-aminophenoxy)benzene represented by the chemical formula (8) is within a range from 90 to 110% by mol based on the total number of mols of tetracarboxylic dianhydride to be used.

Tetracarboxylic dianhydride represented by the chemical formula (9):

In the method for production of the polyimide according to the present invention, tetracarboxylic dianhydride represented by the chemical formula (9) is 3,3',4,4'-biphenyltetracarboxylic dianhydride. This 3,3',4,4'-biphenyltetracarboxylic dianhydride is commercially available and can be easily used, industrially. 3,3',4,4'-biphenyltetracarboxylic dianhydride is also known as a raw material of "UPILEX" (trade name, manufactured by Ube Industries, Ltd.).

The amount of 3,3',4,4'-biphenyltetracarboxylic dianhydride represented by the chemical formula (9) is within a range from 90 to 110% by mol based on the total number of mols of the diamine to be used.

Other raw materials:

In the method for production of the thermoplastic polyimide having good thermal stability of the present invention, 1,3-bis(4-aminophenoxy)benzene represented by the chemical formula (8) and 3,3',4,4'-biphenyltetracarboxylic dianhydride represented by the chemical formula (9) are used as an essential raw material, but a portion of 1,3-bis(4-aminophenoxy)benzene and/or 3,3',4,4'-biphenyltetracarboxylic dianhydride may be replaced by a different diamine and/or tetracarboxylic dianhydride as far as physical properties of the resulting polyimide are not adversely affected.

Specific examples of the diamine, which can be used, include diamine represented by the general formula (c). Specific examples of the tetracarboxylic dianhydride, which can be used, include tetracarboxylic dianhydride represented by the general formula (d).

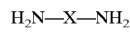

(c)

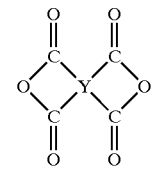

(d)

(wherein X represents a divalent aromatic group and Y represents a tetravalent aromatic group, and specific examples of X include (e) to (h) above described and specific examples of Y include (r) to (x) above described. Specific examples of the divalent aromatic group X Specific examples of the tetravalent aromatic group Y (wherein R each independently is represented by at least one selected from the group consisting of the formulas (i) to (q).)

Hydrogen atoms of aromatic rings the diamine represented by the general formula (c) and/or tetracarboxylic dianhydride represented by the general formula (d) may also be substituted with a substituent having no reactivity with an amino group and a carbonyl group. Specific examples of such a substituent of the hydrogen atom of the aromatic ring include those represented by the chemical formulas (19) to (33).

An amount of the diamine represented by the general formula (c) is preferably within a range from 0 to 10% by mol based on an amount of 1,3-bis(4-aminophenoxy)benzene. When the amount of the diamine represented by the general formula (c) exceeds 10% by mol, the crystallization rate of the resulting polyimide is drastically lowered and it becomes difficult to crystallize it in the mold on injection molding.

An amount of the tetracarboxylic dianhydride represented by the general formula (d) is preferably within a range from 0 to 10% by mol based on an amount of 3,3',4,4'-biphenyltetracarboxylic dianhydride. When the amount of the tetracarboxylic dianhydride represented by the general formula (d) exceeds 10% by mol, the crystallization rate of the resulting polyimide is drastically lowered and-it becomes difficult to cristallize it in the mold on injection molding.

The following specific examples of the diamine represented by the general formula (c) can be used alone, or two or more kinds of them can be used in combination.

p-phenylenediamine
m-phenylenediamine
3,3'-diaminodiphenyl ether
3,4'-diaminodiphenyl ether
4,4'-diaminodiphenyl ether
3,3'-diaminodiphenyl sulfide
3,4'-diaminodiphenyl sulfide
4,4'-diaminodiphenyl sulfide
3,3'-diaminodiphenyl sulfone
3,4'-diaminodiphenyl sulfone 4,4'-diaminodiphenyl sulfone
3,3'-diaminobenzophenone
3,4'-diaminobenzophenone
4,4'-diaminobenzophenone
3,3'-diaminodiphenylmethane
3,4'-diaminodiphenylmethane
4,4'-diaminodiphenylmethane
2,2-di(3-aminiophenyl)propane
2,2-di(4-aminiophenyl)propane
2-(3-aminiophenyl)-2-(4-aminophenyl)propane
2,2-di(3-aminiophenyl)-1,1,1,3,3,3-hexafluoropropane
2,2-di(4-aminiophenyl)-1,1,1,3,3,3-hexafluoropropane
2-(3-aminiophenyl)-2-(4-aminophenyl)-1,1,1,3,3,3-hexafluoropropane
1,1-di(3-aminophenyl)-1-phenylethane
1,1-di(4-aminophenyl)-1-phenylethane
1-(3-aminophenyl)-1-(4-aminophenyl)-1-phenylethane
1,3-bis(3-aminophenoxy)benzene
1,3-bis(4-aminophenoxy)benzene
1,4-bis(3-aminophenoxy)benzene
1,4-bis(4-aminophenoxy)benzene
1,3-bis(3-aminobenzoyl)benzene
1,3-bis(4-aminobenzoyl)benzene
1,4-bis(3-aminobenzoyl)benzene
1,4-bis(4-aminobenzoyl)benzene
1,3-bis(3-amino-α,α-dimethylbenzyl)benzene
1,3-bis(4-amino-α,α-dimethylbenzyl)benzene
1,4-bis(3-amino-α,α-dimethylbenzyl)benzene
1,4-bis(4-amino-α,α-dimethylbenzyl)benzene
1,3-bis(3-amino-α,α-ditrifluoromethylbenzyl)benzene
1,3-bis(4-amino-α,α-ditrifluoromethylbenzyl)benzene
1,4-bis(3-amino-α,α-ditrifluoromethylbenzyl)benzene
1,4-bis(4-amino-α,α-ditrifluoromethylbenzyl)benzene
2,6-bis(3-aminophenoxy)benzonitrile
2,6-bis(3-aminophenoxy)pyridine
4,4'-bis(3-aminophenoxy)biphenyl
4,4'-bis(4-aminophenoxy)biphenyl
bis[4-(3-aminophenoxy)phenyl]ketone
bis[4-(4-aminophenoxy)phenyl]ketone
bis[4-(3-aminophenoxy)phenyl]sulfide
bis[4-(4-aminophenoxy)phenyl]sulfide
bis[4-(3-aminophenoxy)phenyl]sulfone
bis[4-(4-aminophenoxy)phenyl]sulfone
bis[4-(3-aminophenoxy)phenyl]ether
bis[4-(4-aminophenoxy)phenyl]ether
2,2-bis[4-(3-aminophenoxy)phenyl]propane
2,2-bis[4-(4-aminophenoxy)phenyl]propane
2,2-bis[3-(3-aminophenoxy)phenyl]-1,1,1,3,3,3-hexafluoropropane
2,2-bis[4-(4-aminophenoxy)phenyl]-1,1,1,3,3,3-hexafluoropropane The following specific examples of the tetarcarboxylic dianhydride represented by the general formula (d) can be used alone, or two or more kinds of them can be used in combination. pyromellitic dianhydride
3,3',4,4'-benzophenonetetracarboxylic dianhydride
2,2',3,3'-benzophenonetetracarboxylic dianhydride
2,3',3,4'-biphenyltetracarboxylic dianhydride
3,3',4,4'-biphenyltetracarboxylic dianhydride
2,2',3,3'-biphenyltetracarboxylic dianhydride
2,2-bis(3,4-dicarboxyphenyl)propane dianhydride
2,2-bis(2,3-dicarboxyphenyl)propane dianhydride
bis(3,4-dicarboxyphenyl)ether dianhydride
bis(3,4-dicarboxyphenyl)sulfone dianhydride
1,1-bis(2,3-dicarboxyphenyl)ethane dianhydride
bis(2,3-dicarboxyphenyl)methane dianhydride
bis(3,4-dicarboxyphenyl)methane dianhydride
2,2-bis(3,4-dicarboxyphenyl)-1,1,1,3,3,3-hexafluoropropane dianhydride
2,2-bis(2,3-dicarboxyphenyl)-1,1,1,3,3,3-hexafluoropropane dianhydride
1,3-bis[(3,4-dicarboxy)benzoyl]benzene dianhydride
1,4-bis[(3,4-dicarboxy)benzoyl]benzene dianhydride
1,3-bis[(3,4-dicarboxy)phenoxy)benzen dianhydride
1,4-bis[(3,4-dicarboxy)phenoxy)benzen dianhydride
4,4'-bis[(3,4-dicarboxy)phenoxy)biphenyl dianhydride
2,2-bis[4-(3,4-dicarboxy phenoxy)phenyl]propane dianhydride
2,2-bis[3-(3,4-dicarboxy phenoxy)phenyl]propane dianhydride
bis[4-(3,4-dicarboxyphenoxy)phenyl]ether dianhydride
bis[3-(3,4-dicarboxyphenoxy)phenyl]ether dianhydride
bis{4-[3,4-dicarboxyphenoxy)phenyl]ketone dianhydride
bis{3-[3,4-dicarboxyphenoxy)pheny]ketone dianhydride
bis[4-(3,4-dicarboxyphenoxy)phenyl}sulfone dianhydride
bis{3-(3,4-dicarboxyphenoxy)phenyl]sulfone dianhydride
bis{4-[3,4-dicarboxyphenoxy)phenyl]sulfide dianhydride
bis[3-(3,4-dicarboxyphenoxy)phenyl]sulfide dianhydride
2,2-bis{4-[4-(1,2-dicarboxy)phenoxy]phenyl}-1,1,1,3,3,3-hexafluoropropane dianhydride
2,2-bis{4-[3-(1,2-dicarboxy)phenoxy]phenyl}-1,1,1,3,3,3-hexafluoropropane dianhydride
2,3,6,7-naphthalenetetracarboxylic dianhydride
1,4,5,8-naphthalenetetracarboxylic dianhydride
1,2,5,6-naphthalenetetracarboxylic dianhydride Monoamine represented by the chemical formula (10):
The monoamine represented by the chemical formula (10) is an aromatic monoamine.

In the chemical formula (10), V is a monovalent aromatic group.

Specific examples of the monovalent aromatic group V include the group of monovalent aromatic groups of the chemical formulas (14) to (15).

Hydrogen atoms of the aromatic ring of this monoamine may be substituted with a substituent having no reactivity with an amino group and a carbonyl group. Specific examples of the substituent of the hydrogen atom of the aromatic ring include those represented by the chemical formulas (19) to (33).

An amount of the monoamine represented by the chemical formula (10) is within a range from 0.1 to 100% by mol, and preferably from 1 to 50% by mol, based on the total number of mols of the tetracarboxylic dianhydride used.

Specific examples of monoamine represented by the chemical formula (10):
Specific examples of monoamine represented by the chemical formula (10) include aniline, o-toluidine, m-toluidine, p-toluidine, 2,3-xylidine, 2,6-xylidine, 3,4-xylidine, 3,5-xylidine, o-chloroaniline, m-chloroaniline, p-chloroaniline, o-bromoaniline, m-bromoaniline, p-bromoaniline, o-fluoroaniline, m-fluoroaniline, p-fluoroaniline, o-anisidine, m-anisidine, p-anisidine, o-phenetidine, m-phenetidine, p-phenetidine, 2-aminobiphenyl, 3-aminobiphenyl, 4-aminobiphenyl, 2-aminophenylphenyl ether, 3-aminophenylphenyl ether, 4-aminophenylphenyl ether, 2-aminobenzophenone, 3-aminobenzophenone, 4-aminobenzophenone, 2-aminophenylphenyl sulfide, 3-aminophenylphenyl sulfide, 4-aminophenylphenyl sulfide, 2-aminoph enyzphenyl sulfone, 3-aminophenylphenyl sulfone, 4-aminophenylphenyl sulfone, α-naphthylamine, β-naphthylamine, 1-amino-2-naphthol, 2-amino-1-naphthol, 4-amino-1-naphthol, 5-amino-1-naphthol, 5-amino-2-naphthol, 7-amino-2-naphthol, 8-amino-1-naphthol, 8-amino-2-naphthol and the like.

These monoamines can be used alone, or two or more kinds of them can be used in combination.

Dicarboxylic anhdyride represented by the chemical formula (11):

The dicarboxylic anhdyride represented by the chemical formula (11) is an aromatic dicarboxylic dianhydride.

In the formula (11), T is a divalent aromatic group.

Specific examples of the divalent aromatic group T include the group of divalent aromatic groups of the chemical formulas (16) to (18).

Hydrogen atoms of the aromatic ring of this dicarboxylic dianhydride may be substituted with a substituent having no reactivity with an amino group and a carbonyl group. Specific examples of the substituent of the hydrogen atom of the aromatic ring include those represented by the chemical formulas (19) to (33).

An amount of the dicarboxylic dianhydride represented by the chemical formula (11) is within a range from 0.1 to 100% by mol, and preferably from 1 to 50% by mol, based on the total number of mols of the diamine used.

Specific examples of dicarboxylic anhydride represented by the chemical formula (11):

Specific examples of dicarboxylic anhydride represented by the chemical formula (11) include phthalic anhydride, chlorophthalic anhydride, bromophthalic anhydride, fluorophthalic anhydride, 2,3-benzophenonedicarboxylic anhydride, 3,4-benzophenonedicarboxylic anhydride, 2,3-dicarboxyphenylphenyl ether anhydride, 3,4-dicarboxyphenylphenyl ether anhydride, 2,3-biphenyldicarboxylic anhydride, 3,4-biphenyldicarboxylic anhydride, 2,3-dicarboxyphenylsulfonic anhydride, 3,4-dicarboxyphenylphenylsulfonic anhydride, 2,3-dicarboxyphenylphenyl sulfide anhydride, 3,4-dicarboxyphenylphenyl sulfide anhydride, 1,2-naphthalenedicarboxylic anhydride, 2,3-naphthalenedicarboxylic anhydride, 1,8-naphthalenedicarboxylic anhydride and the like.

These dicarboxylic anhydrides can be used alone, or two or more kinds of them can be used in combination.

Adjustment of molecular weight of polyimide:

The polyimide according to the present invention having a desired molecular weight, intrinsic viscosity or melt viscosity can be obtained by appropriately adjusting a charge proportion of 1,3-bis(4-aminophenoxy)benzene represented by the chemical formula (8), 3,3',4,4'-biphenyltetracarboxylic dianhydride represented by the chemical formula (9), monoamine represented by the chemical formula (10) and dicarboxylic anhydride represented by the chemical formula (11), which are used as the raw material.

Adjustment example of charge proportion of raw materials:

① Case Where the Charge Amount of Diamine is Excessive

In case where the charge amount of diamine is excessive, that is, the charge amount of 1,3-bis(4-aminophenoxy)benzene represented by the chemical formula (8) is excessive, the charge amount of 3,3',4,4'-biphenyltetracarboxylic dianhydride represented by the chemical formula (9) is from 90 to 100% by mol based on the number of mols of the diamine charged, while the charge amount of the dicarboxylic anhydride represented by the chemical formula (11) as a terminal blocking agent is from 0.1 to 100% by mol, and preferably from 1 to 50% by mol.

② Case Where the Charge Amount of Tetracarboxylic Dianhydride is Excessive

In case where the charge amount of tetracarboxylic dianhydride is excessive, that is, the charge amount of 3,3',4,4,-biphenyltetracarboxylic dianhydride represented by the chemical formula (9) is excessive, the charge amount of 1,3-bis(4-aminophenoxy)benzene represented by the chemical formula (8) is from 90 to 100% by mol based on the number of mols of the tetracarboxylic dianhydride charged, while the charge amount of the monoamine represented by the chemical formula (10) as a terminal blocking agent is from 0.1 to 100% by mol, and preferably from 1 to 50% by mol.

Reaction method:

In the method for production of the polyimide according to the present invention, the method for reaction of the above raw materials is not specifically limited, and any method capable of producing the polyimide can be applied, including a known method. Among them, it is particularly preferred to react in an organic solvent. Examples of the solvent, which can be used in such a reaction, include N,N-dimethylformamide, N,N-diethylacetamide, N,N-dimethoxyacetamide, N-methyl-2-pyrrolidone, 1,3-dimethyl-2-imidazolidinone, N-methylcaprolactam, 1,2-dimethoxyethane, bis(2-methoxyethyl) ether, 1,2-bis(2-methoxyethoxy)ethane, bis[2-(2-methoxyethoxy)ethyl] ether, tetrahydrofuran, 1,3-dioxane, 1,4-dioxane, pyrroline, picoline, dimethyl sulfoxide, dimethyl sulfone, tetramethylurea, hexamethylphosphoramide, phenol, o-cresol, m-cresol, p-cresol, 3,5-xylenol, 2,3-xylenol, 2,4-xylenol, 2,6-xyleneol, 3,4-xylenol, o-chlorophenol, p-chlorophenol, sulfolane, o-dichlorobenzene, Hediphenyl ether, anisole, benzene, toluene, xylene and the bylike. Particularly preferred solvents are phenol, o-cresol, m-cresol, p-cresol and p-chlorophenol. These organic solvents may be used alone, or two or more kind of them may be used in combination.

In the present invention, the method of adding diamines, tetracarboxylic dianhydrides, aromatic dicarboxylic andhydrides and/or aromatic monoamine to the organic solvent and reacting the mixture includes, for example, the following methods ① to ④ and any addition method may be employed.

① Method of reacting tetracarboxylic dianhydrides with diamines and reacting continuously by the addition of an aromatic dicarboxylic anhydride or an aromatic monoamine.

② Method of reacting diamines with aromatic dicarboxylic anhydrides and reacting continuously by the addition of tetracarboxylic dianhydrides.

③ Method of reacting tetracarboxylic dianhydrides with an aromatic monoamine and reacting continuously by the addition of diamines.

④ Method of reacting by simultaneously adding tetracarboxylic dianhydrides, diamines and an aromatic dicarboxylic anhydride or an aromatic monoamine.

Reaction temperature:

In the method for producing the polyimide according to the present invention, the reaction temperature in the production of the polyimide is preferably within a range from 130° C. to a reflux temperature of the organic solvent. When the reaction temperature is less than 130° C., imidation does not proceed completely even if the reaction is conducted for a long time and the remained amidic acid is imidated on melt molding. Therefore, the viscosity on melting is changed, which is not preferred.

Recovery of reaction product:

In the method for producing the polyimide according to the present invention, the reaction product can be recovered from the solvent of the reaction system or slurry solution by a known conventional method after the completion of the reaction.

The recovery method is not specifically limited, but specific examples thereof include a method of adding dropwise a poor solvent such as toluene to the reaction solution, separating the deposited polyimide by filtration and drying the polyimide and a method of adding dropwise the reaction solution to methanol with stirring vigorously, separating the deposited polyimide by filtration and drying the polyimide.

Molding of polyimide:

The polyimide according to the present invention has excellent melt fluidity and high thermal stability in a molten state and a molded article can-be obtained by molding using a known melt molding method such as extrusion molding, injection molding, compression molding, transfer molding or the like.

Since the polyimide according to the present invention has a large crystallization rate, a sufficiently crystallized molded article can be obtained by molding under proper conditions. The crystallization of the resulting molded article does not proceed sufficiently, sometimes, depending on the molding conditions. In that case, the molded article can be further crystallized by subjecting the molded article to a heat treatment (annealing treatment).

Since the polyimide according to the present invention has high crystallizability, the resulting molded article maintains high elasticity even at a temperature of the glass transition temperature or higher and can be used at high temperature.

Resin composition:

The polyimide according to the present invention can be converted into a resin composition wherein fillers and resins are blended to improve physical properties of the resulting molded article, and the kind and amount of the fillers and resins to be blended as well as blending method are not specifically limited.

Specific examples of the filler include wear resistance improvers, reinforcers, flame retardance improvers, electrical characteristics improvers, tracking resistance improvers, acid resistance improvers, thermal conductivity improvers, and other fillers.

Specific examples of the wear resistance improver include graphite, Carborundom, silica powder, molybdenum bisulfide, fluororesin and the like.

Specific examples of the reinforcer include glass fibers, carbon fibers and the like.

Specific examples of the flame retardance improver include antimony trioxide, magnesium carbonate, calcium carbonate and the like.

Specific examples of the electric characteristics improver include clay, mica and the like.

Specific examples of the tracking resistance improver include asbestos, silica, graphite and the like.

Specific examples of the acid resistance improver include barium sulfate, silica, calcium metasilicate and the like.

Specific examples of the thermal conductivity improver include iron powder, zinc powder, aluminum powder, copper powder and the like.

Specific examples of the other filler include glass beads, glass sphere, talc, diatomaceous earth, alumina, shirasu balloon, hydrated alumina, metal oxide, colorant, pigment and the like.

These fillers can be used alone or plural kinds of them can be used in combination. These fillers can be used in the amount of 1 to 100 parts by weight, preferably from 3 to 85 parts by weight, and more preferably from 5 to 70 parts by weight, based on 100 parts by weight of the polyimide.

When the amount is smaller than 1 part by weight, the effect of improving physical properties is not exerted sometimes. On the other hand, when the amount exceeds 100 parts by weight, the fluidity on molding is damaged sometimes.

Specific examples of the resin include thermoplastic resin. The thermoplastic resin which can be blended includes, for example, polyolefins, polystyrenes, polycarbonate, polyesters, polyamides, polyamide-imide, polyphenylene ether, polyacetal, polyacrylate, polyphenylene sulfide, polysulfones, polyketones, polyether-nitrile, liquid crystal polymer, polyimide having a structure different from the polyimide of the present invention and the like.

Fluororesins such as polytetrafluoroethylene and silicone resins are not thermoplastic, but have a large effect of improving the releasability and rocking properties of the composition. Aromatic polyamide fibers are preferred to improve mechanical characteristics. These resins can be used alone or plural kinds of them can be used in combination.

Colorants, releasants, various stabilizers, plasticizers and oils can also be added.

Polyimide molded article:

The molded article according to the present invention is a molded article comprising a thermoplastic polyimide having a repeating unit represented by the chemical formula (1), a molecular terminal being composed of the chemical formula (2) and/or chemical formula (3), characterized in that:

when the molded article is molten, a melt viscosity ratio MVR calculated by the numerical formula (1) is within a numerical range shown in the numerical formula (2).

Numerical Formula 1

$$MVR=MV30/MV5 \quad (1)$$

(in the numerical formula (1), MV5 is a melt viscosity ([Pa.sec]) determined by melting a sample with maintaining at 420° C. for 5 minutes and measuring at a shear rate within a range from 30 to 500 [sec$^{-1}$], and MV30 is a melt viscosity ([Pa.sec]) determined by melting a sample with maintaining at 420° C. for 30 minutes and measuring at a shear rate within a range from 30 to 500 [sec$^{-1}$])

Numerical Formula 2

$$1.0 \leq MVR \leq 1.5 \quad (2)$$

(in the numerical formula (2), MVR is a melt viscosity ratio calculated by the numerical formula (1));

and/or a molded article characterized in that:
a melt index retention MIR calculated by the numerical formula (3) is within a numerical range shown in the numerical formula (4).

Numerical Formula 3

$$MIR=MI30/MI5 \quad (3)$$

(in the numerical formula (3), MI5 is MI ([g/10 min.]) determined by melting a sample with maintaining at 420° C. for 5 minutes and measuring under a load of 10.3 N in accordance with ASTM D-1238 and MI30 is MI ([g/10 min.]) determined by melting a sample with maintaining at 420° C. for 30 minutes and measuring)

Numerical Formula 4

$$0.7 \leq MIR \leq 1.0 \tag{4}$$

(in the numerical formula (4), MIR is a melt index retention calculated by the numerical formula (3)).

The molded article according to the present invention can be obtained by molding the polyimide according to the present invention and/or the resin composition comprising the polyimide according to the present invention, using a known melt molding method such as extrusion molding, injection molding, compression molding, transfer molding or the like.

Applications:

The polyimide according to the present invention and/or the molded article according to the present invention are useful in various applications because of excellent physical properties, and the applications are not specifically limited. Among them, they are particularly useful in the application for use at high temperature of not less than 230° C. and the application to which high dimensional accuracy is required, by making use of features such as excellent elastic modulus within a wide temperature range and less dimensional change.

The polyimide according to the present invention and/or the molded article according to the present invention are particularly useful in the following applications:

- tray for IC packaging, tray for IC production process, IC socket, wafer carrier, etc. in the field of a semiconductor container;
- jigs for production, such as hard disc carrier, liquid crystal display carrier, tray for quartz oscillator, etc., including connector, socket and bobbin in the filed of electrical/electronic parts;
- separating claw for copying machine, heat-insulating bearing for copying machine, gear for copying machine, etc. in the filed of a business machine;
- thrust washer, transmission ring, piston ring, oil sealing, etc. in the filed of automobile parts;
- bearing retainer, pump gear, conveyor chain, slide bush for stretch machine, etc. in the filed of an industrial machinery; and
- film and fibers.

The following Examples further illustrate the present invention in detail but are not to be construed to limit the scope thereof.

Physical properties of the polyimide were measured by the following procedures.

① Inherent viscosity (η inh)

The inherent viscosity (η inh) was measured at 35° C. by using a Ubbellohde viscometer after dissolving polyimide powders (concentration: 0.5 g/100 g) in a mixed solvent of 90% by weight of p-chlorophenol and 10% by weight of phenol.

② Melt viscosity (MV)

The melt viscosity (MV) was determined in the following procedure. That is, MV5 and MV30 were measured by using a flow tester (High-Chemical Flow Tester CFT500A, manufactured by Shimadzu Corp.) under a load of 100 kg (pressure: 9.8 MPa) in accordance with Japanese Industrial Standard (JIS) K7210 [flow test method (reference test)] and then MVR was calculated.

MV5: melt viscosity ([Pa.sec]) determined by melting a sample with maintaining at 420° C. for 5 minutes and measuring at a shear rate within a range from 30 to 500 [sec$^{-1}$]

MV30: melt viscosity ([Pa.sec]) determined by melting a sample with maintaining at 420° C. for 30 minutes and measuring at a shear rate within a range from 30 to 500 [sec$^{-1}$]

MVR: melt viscosity ratio MVR=MV30/MV5

③ Melt flow index (MI)

The melt flow index (MI) was determined in the following procedure. That is, MI15 and MI30 were measured under a load of 10.3 N in accordance with ASTM D-1238 and then MIR was calculated.

MI5: MI ([g/10 min.]) determined by melting a sample with maintaining at 420° C. for 5 minutes and measuring MI30: MI ([g/10 min.]) determined by melting a sample with maintaining at 420° C. for 30 minutes and measuring MIR: melt flow index retention MIR=MI30/MI5

④ Change in melt viscosity (η*) with a laps of time

The change in melt viscosity (η*) with a laps of time was measured by using a melt viscoelasticity measuring apparatus ARES-2KFRTN-F10-STD manufactured by Rheometrix Co. in a nitrogen atmosphere under the conditions of a measuring temperature of 420° C., a frequency of 0.1 Hz, a geometry of 25 mm φ (parallel plate), a gap of 10 mm and a strain of 2% in accordance with the method described in Macromolecules, 1997, Vol. 30, pages 1012–1022. The sample was molded into a shape of tablet by using a tablet-molding device and was mounted to the measuring portion. After 2 minutes, the observation was initiated.

⑤ Form of strand

The transparency of a strand extruded from a flow tester was visually observed on measurement of melt viscosity.

It is empirically judged that an opaque strand is sufficiently crystallized, while a transparent strand is insufficiently crystallized.

⑥ 5% weight loss temperature

The 5% weight loss temperature was measured in an air by using DTG (differential scanning calorimeter/thermogravimeter, DT-40 series, DTG-40M, manufactured by Shimadzu Corp.).

⑦ Melting point (Tm)

The melting point (Tm) was measured at a temperature ranging from 25 to 430° C. at a temperature rise rate of 10 [° C./min] by using DSC (differential scanning calorimeter, EXSTAR6200, manufactured by Seiko Electronic Industries, Inc.).

⑧ Crystallization behavior

The crystallization behavior was determined in the following procedure. That is, a crystallization temperature in the temperature drop process (Tc), a crystallization energy (ΔHc), a crystallization temperature in the second temperature rise process (Tc), a crystallization energy (ΔHc), a melting point (Tm) and a melting energy (ΔHm) were measured by using DSC (differential scanning calorimeter, EXSTAR6200, manufactured by Seiko Electronic Industries, Inc.).

The heating/cooling pattern on measurement of DSC included the following three stages.

(1) First stage (temperature rise process (first time)) 25° C.→430° C. (temperature rise rate: 10 [° C./min.])
(2) Second stage (temperature drop process) 430° C.→50° C. (cooling rate: 50 [° C./min.])

(3) Third stage (temperature rise process (second time)) 50° C.→430° C. (temperature rise rate: 10 [° C./min.])

The higher the crystallization energy (ΔHc) of the temperature drop process, the higher the crystallization degree of polyimide after cooling.

1,3-bis(4-aminophenoxy)benzene was evaluated by the following procedure.

⑨ HPLC measurement

The apparent purity was determined in the following procedure. That is, a methanol solution (500 ppm by weight) of the sample was produced and the apparent purity was determined from an absorption area percentage at a measuring wavelength of 254 nm by high-performance liquid chromatography (column: ODS column, CrestPak C18T-5 4.6×250 mm, manufactured by JASCO Co., mobile phase: methanol/water=75/25, flow rate: 0.7 ml/min., charge amount: 20 μl).

Incidentally, an azo compound as an impurity can not be detected under these conditions.

(x) Content of azo compound

The amount of the azo compound in 1,3-bis(4-aminophenoxy)benzene was quantitatively determined from an absorption area percentage at a measuring wavelength of 254 nm by gel permeation chromatography (GPC, column: GPC-KF801 0.8×300 mm×2 tubes, manufactured by Shodex Co., mobile phase: THF, flow rate: 0.75 ml/min., charge amount: 20 μl).

(xi) FD-MS measurement

The FD-MS measurement of 1,3-bis(4-aminophenoxy) benzene was conducted under the following conditions by using SX-102A manufactured by JEOL Ltd.

Scan rage: 10–2000, Scan speed: 10 sec, Cycle Time: 10 sec, Accel volt: 8 kV, Ion multi: 2.0 kV, Solvent: DMF, Emitter current: ~42 mA (2.0 mA/min.), Calibration: Ultramark.

In the following Examples and Comparative Examples, a flask equipped with a stirrer, a reflux condenser with a separator, a thermometer and a dropping apparatus with a heater was used as a reaction vessel in the production of 1,3-bis(4-nitrophenoxy)benzene unless otherwise stated. In the production of 1,3-bis(4-aminophenoxy)benzene, a flask equipped with a hydrogen gas introducing apparatus, an evacuation apparatus, a dropping apparatus, a mercury sealing type stirrer and a thermometer was used as a reaction vessel unless otherwise stated. Hereinafter, N,N-dimetylformamide is abbreviated to DMF.

In the following Examples and Comparative Examples, a flask equipped with a stirrer, a reflux condenser and a nitrogen introducing apparatus was used as a reaction vessel unless otherwise stated.

In the following Examples and Comparative Examples, pellets used in injection molding were produced by melt-extruding the resulting polyimide powders at 420° C. using a monoaxial extruder having a diameter of 25 mm.

In the following Examples and Comparative Examples, a spiral flow length was measured under the following molding conditions using pellets produced. A ratio of the flow length at the first shot to that at the tenth shot was determined as a flow length retention percentage, which was taken as an index of flow stability.

<Spiral Flow Length Measuring Test>

Cylinder temperature: 420° C.
Mold temperature: 200° C.
Injection pressure: 147 MPa
Flow thickness: 1 mm
Molding cycle: 120 seconds In the following Examples and Comparative Examples, a test piece for evaluation of mechanical properties of polyimide was obtained by molding pellets under the following molding conditions using a conventional injection molder.

<Injection Molding Conditions>

Cylinder temperature: 420° C.
Mold temperature: 210° C.
Injection pressure: 147 MPa
Retention time in mold: 30 seconds

EXAMPLE 1

A. Process for Production of 1,3-bis(4-Nitrophenoxy)benzene

In a reaction vessel, a raw material ① was charged and maintained at a temperature of 130 to 135° C. In a dropping apparatus with a heater, a raw material ② was charged and a solution state was maintained by maintaining at a temperature of 70 to 80° C. The raw material ② in the dropping apparatus with a heater was added dropwise over 6 hours with stirring the reaction system.

During the reaction, water produced and toluene were azeotropically distillated, condensed by the reflux condenser and then separated from the separator. After the completion of the dropwise addition, the reaction product was stirred continuously for 3 hours with maintaining within this temperature range.

Raw material ①: raw material charged in the reaction vessel (maintained at 130 to 135° C.)

| | |
|---|---|
| Potassium carbonate | 629.3 g (6.0 mol) |
| DMF | 2000.0 g |
| Toluene | 300.0 g |

Raw material ②: raw material charged in the dropping apparatus with a heater (maintained at 70 to 80° C.)

| | |
|---|---|
| Resorcin | 550.6 g (5.0 mol) |
| p-chloronitrobenze | 1622.9 g (10.3 mol) |
| DMF | 1000.0 g |

After the completion of the reaction, the reaction mass was cooled to 100° C. and thermally filtered at 100° C. to collect a solid, and then the solid on a filter paper was washed with 300 g of DMF at 100° C. 1200 g of pure water was charged with maintaining the resulting filtrate and wash (total amount: 4707 g, purity: 93.8%) in a flask with a stirrer at 90° C. After cooling to 30° C. over 3 hours, crystals of the deposited 1,3-bis(4-nitrophenoxy)benzene were collected by filtration and then washed with a mixed solution of 990 g of DMF and 360 g of pure water on the filter paper.

1857 g of this 1,3-bis(4-nitrophenoxy)benzene (undried product, purity: 99.9%) was dissolved in 2743 g of DMF to prepare 4600 g of a 1,3-bis(4-nitrophenoxy)benzene/DMF solution.

B. Process for Production of 1,3-bis(4-Aminophenoxy)benzenze

A raw material ③ was charged in a reaction vessel and a raw material ④ was charged in a dropping apparatus. After the atmosphere in the reaction system was replaced by a hydrogen gas, the temperature was raised to 90° C. with stirring.

Raw material ③: raw material charged in the reaction vessel

| | |
|---|---|
| DMF | 400.0 g |
| 5% palladium/alumina catalyst (manufactured by NE Chemcat Co.) | 6.5 g |

Raw material ④: raw material charged in the dropping apparatus 1,3-bis(4-nitrophenoxy) 1150.0 g
benzene/DMF solution The 1,3-bis(4-nitrophenoxy)benzene/DMF solution as the raw material ④ is obtained in the above process for production of 1,3-bis(4-nitrophenoxy)benzene.

The catalytic reduction reaction of 1,3-bis(4-nitrophenoxy)benzene was conducted with adding dropwise the raw material ④ from the dropping apparatus. During the reaction, hydrogen was introduced in the reaction system in accordance with the degree of hydrogen absorption.

Four hours after the beginning of the dropwise addition, the dropwise addition of the raw material ④ has been completed and, at almost the same time, absorption of hydrogen has been terminated.

One hour after the completion of the dropwise addition, stirring was continued as it is. After the atmosphere in the reaction system was replaced by nitrogen, the reaction solution was cooled to room temperature and the catalyst was isolated from the reaction solution by filtration.

1600 g of water was added to the filtrate and the deposited crystal was filtered and then dried in a weak nitrogen flow at 90° C. under reduced pressure for 8 hours to obtain 290.0 g of light yellow 1,3-bis(4-aminophenoxy)benzene (yield: 79.4%).

| | |
|---|---|
| Purity | 99.4% |
| Content of azo compound | 0.07% |

EXAMPLE 2

A. Process for Production of 1,3-bis(4-Nitrophenoxy)benzene

In just the same manner as in Example 1, the production of 1,3-bis(4-nitrophenoxy)benzene was conducted.

B. Process for Production of 1,3-bis(4-Aminophenoxy)benzene

A raw material ③ was charged in a reaction vessel and a raw material ④ was charged in a dropping apparatus. After the atmosphere in the reaction system was replaced by a hydrogen gas, the temperature was raised to 90° C. with stirring.

Raw material ③: raw material charged in the reaction vessel

| | |
|---|---|
| DMF | 40.0 g |
| 5% palladium/alumina catalyst (manufactured by NE Chemcat Co.) | 0.65 g |

Raw material ④: raw material charged in the dropping apparatus 1,3-bis(4-nitrophenoxy) 115.0 g
benzene/DMF solution The 1,3-bis(4-nitrophenoxy)benzene/DMF solution as the raw material ④ is obtained in the above process for production of 1,3-bis(4-nitrophenoxy)benzene.

The catalytic reduction reaction of 1,3-bis(4-nitrophenoxy)benzene was conducted with adding dropwise the raw material ④ from the dropping apparatus. During the reaction, hydrogen was introduced in the reaction system in accordance with the degree of hydrogen absorption.

Eight hours after the beginning of the dropwise addition, the dropwise addition of the raw material ④ has been completed and, at almost the same time, absorption of hydrogen has been terminated.

One hour after the completion of the dropwise addition, stirring was continued as it is. After the atmosphere in the reaction system was replaced by nitrogen, the reaction solution was cooled to room temperature and the catalyst was isolated from the reaction solution by filtration.

160 g of water was added to the filtrate and the deposited crystal was filtered and then dried in a weak nitrogen flow at 90° C. under reduced pressure for 8 hours to obtain 29.2 g of white 1,3-bis(4-aminophenoxy)benzene (yield: 79.9%).

| | |
|---|---|
| Purity | 99.6% |
| Content of azo compound | 0.05% |
| Comparative Example 1 | |

COMPARATIVE EXAMPLE 1

A. Process for Production of 1,3-bis(4-Nitrophenoxy)benzene

In just the same manner as in Example 1, the production of 1,3-bis(4-nitrophenoxy)benzene was conducted.

B. Process for Production of 1,3-bis(4-Aminophenoxy)benzene

A raw material ③ and a raw material ④ were charged in a reaction vessel. After the atmosphere in the reaction system was replaced by a hydrogen gas, the catalytic reduction reaction was conducted at 90° C. with stirring for 5 hours. During the reaction, hydrogen was introduced in the reaction system in accordance with the degree of hydrogen absorption. Three hours after the beginning of the reaction, absorption of hydrogen has been terminated.

Raw material ③: raw material charged in the reaction vessel

| | |
|---|---|
| DMF | 40.0 g |
| 5% palladium/alumina catalyst (manufactured by NE Chemcat Co.) | 0.65 g |

Raw material ④: raw material charged in the reaction vessel 1,3-bis(4-nitrophenoxy) 115.0 g
benzene/DMF solution The 1,3-bis(4-nitrophenoxy)benzene/DMF solution as the raw material ④ is obtained in the above process for production of 1,3-bis(4-nitrophenoxy)benzene.

After the completion of the reaction, 29.4 g of light brown 1,3-bis(4-aminophenoxy)benzene (yield: 80.4%) was obtained in the same manner as in Example 2.

| | |
|---|---|
| Purity | 99.6% |
| Content of azo compound | 0.75% |

EXAMPLE 3

A. Process for Production of 1,3-bis(4-Nitrophenoxy)benzene

In a reaction vessel, a raw material ① and a raw material ② were charged and then reacted at 135–140° C. for 8 hours. During the reaction, water produced and toluene were azeotropically distillated, condensed by the reflux condenser and then separated from the separator.

Raw material ①: raw material charged in the reaction vessel

| | |
|---|---|
| Potassium carbonate | 82.93 g (0.60 mol) |
| DMF | 200.0 g |
| Toluene | 30 0 g |

Raw material ②: raw material charged in the reaction vessel

| | |
|---|---|
| Resorcin | 55.06 g (0.5 mol) |
| p-chloronitrobenze | 173.32 g (1.10 mol) |
| DMF | 100.0 g |

After the completion of the reaction, the reaction solution was cooled and filtered to remove a solid product. The resulting filtrate and 122.0 g of pure water were charged in a flask with a stirrer, stirred at 90° C. for 1 hour and then slowly cooled to 30° C. over 3 hours. The deposit was filtered and washed with a mixed solution of 30.0 g of DMF and 12.2 g of pure water to obtain orange crude 1,3-bis(4-nitroxy)benzene. This crude 1,3-bis(4-nitroxy)benzene was slugged with 162.9 g of methanol at room temperature for 30 minutes, filtered, slugged again with 169.2 g of methanol at room temperature for 30 minutes, filtered and then dried in a weak nitrogen flow at 80° C. under reduced pressure for 8 hours to obtain 141.7 g of 1,3-bis(4-nitrophenoxy)benzene (yield: 80.4%, purity: 99.7%) as yellow powders.

This 1,3-bis(4-nitrophenoxy)benzene (70.5 g, 0.2 mol) was dissolved in 125.3 g of DMF to prepare 195.8 g of a 1,3-bis (4-nitrophenoxy) benzene/DMF solution.

B. Process for Production of 1,3-bis(4-Aminophenoxy)benzene

A raw material ③ was charged in a reaction vessel and a raw material ④ was charged in a dropping apparatus. After the atmosphere in the reaction system was replaced by a hydrogen gas, the temperature was raised to 90° C. with stirring.

Raw material ③: raw material charged in the reaction vessel

| | |
|---|---|
| DMF | 40.0 g |
| 5% palladium/alumina catalyst (manufactured by NE Chemcat Co.) | 0.65 g |

Raw material ④: raw material charged in the dropping apparatus 1,3-bis(4-nitrophenoxy) 115.0 g benzene/DMF solution The 1,3-bis(4-nitrophenoxy)benzene/DMF solution as the raw material ④ is obtained in the above process for production of 1,3-bis(4-nitrophenoxy)benzene.

The catalytic reduction reaction of 1,3-bis(4-nitrophenoxy)benzene was conducted with adding dropwise the raw material ④ from the dropping apparatus. During the reaction, hydrogen was introduced in the reaction system in accordance with the degree of hydrogen absorption.

Four hours after the beginning of the dropwise addition, the dropwise addition of the raw material ④ has been completed and, at almost the same time, absorption of hydrogen has been terminated.

One hour after the completion of the dropwise addition, stirring was continued as it is. After the atmosphere in the reaction system was replaced by nitrogen, the reaction solution was cooled to room temperature and the catalyst was isolated from the reaction solution by filtration.

160 g of water was added to the filtrate and the deposited crystal was filtered and then dried in a weak nitrogen flow at 90° C. under reduced pressure for 8 hours to obtain 28.7 g of white 1,3-bis(4-aminophenoxy)benzene (yield of reduction reaction: 83.6%).

| | |
|---|---|
| Purity | 99.5% |
| Content of azo compound | 0.08% |
| Comparative Example 2 | |

COMPARATIVE EXAMPLE 2

A. Process for Production of 1,3-bis(4-Nitrophenoxy)benzene

In just the same manner as in Example 3, the production of 1,3-bis(4-nitrophenoxy)benzene was conducted.

B. Process for Production of 1,3-bis(4-Aminophenoxy)benzene

A raw material ③ was charged in a reaction vessel. After the atmosphere in the reaction system was replaced by a hydrogen gas, the catalytic reduction reaction was conducted at 70 to 80° C. with stirring for 5 hours. During the reaction, hydrogen was introduced in the reaction system in accordance with the degree of hydrogen absorption. Four hours after the beginning of the reaction, absorption of hydrogen has been terminated.

Raw material ③: raw material charged in the reaction vessel

| | |
|---|---|
| 5% palladium/alumina catalyst (manufactured by NE Chemcat Co.) | 1.33 g |
| 1,3-bis(4-nitrophenoxy)benzene | 52.85 g (0.15 mol) |
| DMF | 130.00 g |

The 1,3-bis(4-nitrophenoxy)benzene/DMF solution as the raw material ③ is obtained in the above process for production of 1,3-bis(4-nitrophenoxy)benzene.

After the completion of the reaction, the catalyst was removed by filtration and 1.5 g of activated carbon (Shirasagi (guaranteed), manufactured by Takeda Chemical Industries, Ltd.) was added, followed by stirring at 90° C. for 1 hour. After activated carbon was removed by filtering in a nitrogen atmosphere at 90° C., 205 g of pure water was added and the reaction solution was stirred in a nitrogen atmosphere at 90° C. for 1 hour and then slowly cooled to 30° C. over 3 hours. The deposit was filtered, slugged with 100 g of methanol at room temperature for 30 minutes, filtered and then dried in a weak nitrogen flow at 80° C. under reduced pressure for 8 hours to obtain 31.2 g of white 1,3-bis(4-aminophenoxy)benzene (yield: 71.2%).

| Purity | 99.6% |
|---|---|
| Content of azo compound | 0.82% |

COMPARATIVE EXAMPLE 3

A. Process for Production of 1,3-bis(4-Nitrophenoxy)benzene

In just the same manner as in Example 3, the production of 1,3-bis(4-nitrophenoxy)benzene was conducted.

B. Process for Production of 1,3-bis(4-Aminophenoxy)benzene

A raw material ③ was charged in a reaction vessel. After the atmosphere in the reaction system was replaced by a hydrogen gas, the catalytic reduction reaction was conducted at 50° C. with stirring for 3 hours. During the reaction, hydrogen was introduced in the reaction system in accordance with the degree of hydrogen absorption. Two hours after the beginning of the reaction, absorption of hydrogen has been terminated.

| 5% palladium/carbon catalyst (containing 50% water) (manufactured by NE Chemcat Co.) | 1.60 g |
|---|---|
| 113-bis(4-nitrophenoxy)benzene | 52.85 g (0.15 mol) |
| 2-methoxyethanol | 130.00 g |

The 1,3-bis(4-nitrophenoxy)benzene/DMF solution as the raw material ③ is obtained in the above process for production of 1,3-bis(4-nitrophenoxy)benzene.

After the completion of the reaction, the catalyst was removed by filtration and 140 g of pure water was added. The reaction solution was stirred in a nitrogen atmosphere at 90° C. for 1 hour and then slowly cooled to 30° C. over 3 hours. The deposit was filtered, slugged with 100 g of methanol at room temperature for 30 minutes, filtered and then dried in a weak nitrogen flow at 80° C. under reduced pressure for 8 hours to obtain 33.7 g of white 1,3-bis(4-aminophenoxy)benzene (yield: 77.0%).

| Purity | 99.6% |
|---|---|
| Content of azo compound | 0.75% |

COMPARATIVE EXAMPLE 4

C. 1,3-bis(4-Aminophenoxy)benzene 1,3-bis(4-aminophenoxy)benzene was purchased from Wakayama Seika Company. The purchased 1,3-bis(4-aminophenoxy)benzene was light brown.

| Purity | 99.7% |
|---|---|
| Content of azo compound | 0.94% |

In the FIG. 1, [TIC] is represent to total ionchromatogram, Mass spectrum 1 is the analytical results of the part (1) of [TIC].

Mass spectrum 2 is the analytical results of the part (1) of [TIC].

COMPARATIVE EXAMPLE 5

C. 1,3-bis(4-Aminophenoxy)benzene 1,3-bis(4-aminophenoxy)benzene (guaranteed reagent) was purchased from Wako Pure Chemical Industries, Ltd. The purchased 1,3-bis(4-aminophenoxy)benzene was light brown.

| Purity | 99.9% |
|---|---|
| Content of azo compound | 0.82% |

COMPARATIVE EXAMPLE 6

D. Process for Purification of 1,3-bis(4-Aminophenoxy)benzene

A raw material ⑤ was charged in a reaction vessel, molten with heating in a nitrogen atmosphere at 90° C. for 1 hour and then cooled to 30° C. over 4 hours. The reaction solution on melting was deep-black.

Raw material ⑤: raw material charged in the reaction vessel

| 1,3-bis(4-aminophenoxy)benzene | 29.24 g (0.1 mol) |
|---|---|
| Pure water | 292.4 g |
| 35% Hydrogen chloride water | 26.0 g (0.26 mol) |
| Sodium chloride | 5.8 g |

As 1,3-bis(4-aminophenoxy)benzene as the raw material ⑤, those purchased from Wakayama Seika Company were used.

The deposited gray 1,3-bis(4-aminophenoxy)benzene hydrochloride was recovered by filtration.

A raw material ⑥ was charged in a reaction vessel and a raw material ⑦ was charged in a dropping apparatus. After the raw material ⑥ was dissolved with heating in a nitrogen atmosphere at 90° C. for 1 hour, the raw material ⑦ was added dropwise over 30 minutes. The aqueous layer before the dropwise addition was deep-black and the toluene layer was colorless, while the aqueous layer after the dropwise addition was colorless and the toluene layer was deep-black.

Raw material ⑥: raw material charged in the reaction vessel

| 1,3-bis(4-aminophenoxy)benzene hydrochloride | 117.0 g |
|---|---|

| | |
|---|---|
| toluene | |
| Pure water | 117.0 g |

Raw material ⑦: raw material charged in the reaction vessel
  28% ammonia water 13.4 g (0.22 mol)
  1,3-bis(4-aminophenoxy)benzene hydrochloride as the raw material ⑤ is obtained by the above reaction.

The reaction solution was partitioned by allowing to stand for a while, thereby to remove the aqueous water, and then 117.0 g of pure water was added and the solution was stirred at 90° C. for 1 hour. After the aqueous layer was removed again by allowing to stand for a while, 1.5 g of activated carbon (Shirasagi (guaranteed), manufactured by Takeda Chemical Industries, Ltd.) was added and the solution was stirred at 90° C. for 1 hour. Activated carbon was removed by thermal filtration at 90° C., and then the filtrate was slowly cooled to 30° C. over 4 hours. The deposited 1,3-bis(4-aminophenoxy)benzene was recovered by filtration, washed with toluene and then dried in a weak nitrogen flow at 80° C. for 6 hours to obtain 17.3 g of light brown 1,3-bis(4-aminophenoxy)benzene (yield: 57.7%).

| | |
|---|---|
| Purity | 99.9% |
| Content of azo compound | 0.65% |

EXAMPLE 4

D. Process for Purification of 1,3-bis(4-Aminophenoxy)benzene

Simple distillation of 1,3-bis(4-aminophenoxy)benzene was conducted.
Raw material ⑤: raw material supplied to evaporator (stored in a dissolved state at 140° C.)
  1,3-bis(4-aminophenoxy)benzene 10130 g
  As 1,3-bis(4-aminophenoxy)benzene as the raw material ⑤, those purchased from Wakayama Seika Company were used. Evaporator (Smith type thin film evaporator)
  2-03 type thin film distillator manufactured by Shinko Pantec Co.
  Heating/heat transfer area: 0.034 m²
  Revolution number of rotary: 450 rpm
Distillation conditions
  Heat transfer surface temperature: 270° C.
  Vacuum degree: 17.3 Pa (0.13 Torr)
  Raw material supply rate: 4.2 g/min.
  9700 g of 1,3-bis(4-aminophenoxy)benzene was obtained as the distillate. The resulting 1,3-bis(4-aminophenoxy)benzene was transparent light yellow on melting and was orangish white after solidification with cooling. 426 g of the distillation residue was in the form of a blackish brown tar and hardly showed fluidity.

| | |
|---|---|
| Purity | 99.2% |
| Content of azo compound | 0.09% |

EXAMPLE 5

E. Process for Production of Polyimide

Polyimide was produced by using 1,3-bis(4-aminophenoxy)benzene (purity: 99.2%, content of azo compound: 0.09%) obtained in Example 4.

A raw material ⑧ was charged in a reaction vessel having a volume of 0.1 m³, heated to 200° C. with stirring in a nitrogen atmosphere and then reacted at 200° C. for 8 hours. After a lapse of 8 hours, a raw material ⑨ was added and the reaction was conducted for additional 4 hours. During the reaction, effusion of water (about 110 ml) was confirmed. During the reaction, the mass was transparent light yellow.

After the completion of the reaction, the reaction system was cooled to room temperature and 37.5 kg of toluene was added dropwise over about 2 hours to deposit polyimide. After the slurry solution was filtered, the resulting polyimide cake was washed with toluene and dried in nitrogen at 300° C. for 4 hours to obtain yellow polyimide powders.
Raw material ⑧:

| | |
|---|---|
| 1,3-bis(4-aminophenoxy)benzene | 877.1 g (3.000 mol) |
| 3,3',4,4'-biphenyltetracarboxylic dianhydride | 857.9 g (2.916 mol) |
| Phthalic dianhyride | 24.9 g (0.168 mol) |
| m-cresol | 15.0 kg |

Raw material ⑨
  Phthalic anhydride 24.9 g (0.168 mol)

F. Physical Properties of Polyimide

The physical properties of the resulting polyimide were as follows.

| | |
|---|---|
| Yield | 1580 [g] |
| Yield | 95.6 [%] |
| Intrinsic viscosity | 1.00 [dl/g] |
| MV5 | 960 [Pa · sec] |
| MV30 | 1120 [Pa · sec] |
| MVR | 1.16 |
| Form of strand | opaque yellow (sufficiently recrystallized) |
| MI5 | 23.6 [g/10 min.] |
| MI30 | 20.4 [g/10 min.] |
| MIR | 0.86 |
| Melting point (Tm) | 398 [° C.] |
| 5% weight loss temp. | 571 [° C.] |

G. Molding Test

The resulting polyimide powders were melt-extruded at 420° C. to prepare opaque yellow pellets. The transparent resin extruded in the molten state was crystallized immediately after extruding from a die, resulting in an opaque resin.

Using the above pellets, a spiral flow length and a retention percentage of the flow length were determined.
<Results of Spiral Flow Length Measuring Test>

| | Spiral flow length |
|---|---|
| First shot | 390 [mm] |
| Tenth shot | 380 [mm] |
| Spiral flow length retention percentage | 97 [%] |

The above pellets were injection-molded to form various test pieces. The resulting test pieces were crystallized in the mold.

Using the test pieces obtained in 1–5 shots and those obtained in 20–25 shots, the tensile strength, flexural strength and Izod impact (notched) strength were measured in accordance with ASTM D-638, D-790 and D-256, respectively. The results are shown in Table-1.

As is apparent from these results, the polyimide of the present invention did not cause a change in resin fluidity and physical properties on molding and, therefore, products having stable moldability and stable physical properties could be produced.

TABLE 1

|  | 1–5 shots in average | 20–25 shots in average |
| --- | --- | --- |
| Tensile strength [MPa] | 148 | 148 |
| Tensile elongation [%] | 7 | 7 |
| Flexural strength [MPa] | 310 | 310 |
| Flexural modulus [MPa] | 6420 | 6420 |
| Izod impact strength [J/m] | 70 | 70 |

EXAMPLE 6

E. Process for Production of Polyimide

Polyimide was produced in the same manner as in Example 5 except that 1,3-bis(4-aminophenoxy)benzene (purity: 99.2%, content of azo compound: 0.09%) obtained in Example 4 was used and the amount of the raw materials ⑧ and ⑨ was changed to the amount described below. Raw material ⑧:

| 1,3-bis(4-aminophenoxy)benzene | 877.1 g (3.000 mol) |
| --- | --- |
| 3,3',4,4'-biphenyltetracarboxylic dianhydride | 861.5 g (2.928 mol) |
| Phthalic anhyride | 21.3 g (0.144 mol) |
| m-cresol | 15.0 kg |

Raw material ⑨

Phthalic anhydride 21.3 g (0.144 mol)

F. Physical Properties of Polyimide

The physical properties of the resulting polyimide were as follows.

| Yield | 1585 [g] |
| --- | --- |
| Yield | 96.0 [%] |
| Intrinsic viscosity | 1.11 [dl/g] |
| MV5 | 1560 [Pa · sec] |
| MV30 | 1890 [Pa · sec] |
| MVR | 1.21 |
| Form of strand | opaque yellow (sufficiently recrystallized) |
| MI5 | 14.8 [g/10 min.] |
| MI30 | 12.1 [g/10 min.] |
| MIR | 0.82 |
| Melting point (Tm) | 399 [° C.] |
| 5% weight loss temp. | 574 [° C.] |

G. Molding Test

The pellets were prepared in the same manner as in Example 5. The transparent resin extruded in the molten state was crystallized immediately after extruding from a die, resulting in an opaque resin.

Using the above pellets, a spiral flow length and a retention percentage of the flow length were determined.

<Results of Spiral Flow Length Measuring Test>

|  | Spiral flow length |
| --- | --- |
| First shot | 300 [mm] |
| Tenth shot | 280 [mm] |
| Spiral flow length retention percentage | 83 [%] |

Various test pieces were molded in the same manner as in Example 5 and mechanical properties were measured. The results are shown in Table-2. The resulting test pieces were crystallized in the mold.

As is apparent from these results, the polyimide of the present invention did not cause a change in resin fluidity and physical properties on molding and, therefore, products having stable moldability and stable physical properties could be produced.

TABLE 2

|  | 1–5 shots in average | 20–25 shots in average |
| --- | --- | --- |
| Tensile strength [MPa] | 210 | 210 |
| Tensile elongation [%] | 10 | 10 |
| Flexural strength [MPa] | 460 | 470 |
| Flexural modulus [MPa] | 6160 | 6190 |
| Izod impact strength [J/m] | 80 | 80 |

COMPARATIVE EXAMPLE 7

E. Process for Production of Polyimide

Polyimide was produced in the same manner as in Example 5 except that 1,3-bis(4-aminophenoxy)benzene (purity: 99.7%, content of azo compound: 0.94%) obtained in Comparative Example 4 was used.

Raw material ⑧:

| 1,3-bis(4-aminophenoxy)benzene | 877.1 g (3.000 mol) |
| --- | --- |
| 3,3',4,4'-biphenyltetracarboxylic dianhydride | 857.9 g (2.916 mol) |
| Phthalic anhyride | 24.9 g (0.168 mol) |
| m-cresol | 15.0 kg |

Raw material ⑨

Phthalic anhydride 24.9 g (0.168 mol)

F. Physical Properties of Polyimide

The physical properties of the resulting polyimide were as follows.

| Yield | 1556 [g] |
| --- | --- |
| Yield | 94.2 [%] |
| Intrinsic viscosity | 1.11 [dl/g] |
| MV5 | 1820 [Pa · sec] |
| MV30 | 3240 [Pa · sec] |

-continued

| | |
|---|---|
| MVR | 1.78 |
| Form of strand | opaque yellow (sufficiently recrystallized) |
| MI5 | 10.2 [g/10 min.] |
| MI30 | No flow [g/10 min.] |
| MIR | — |
| Melting point (Tm) | 397 [° C.] |
| 5% weight loss temp. | 568 [° C.] |

G. Molding Test

The pellets were prepared in the same manner as in Example 5. The transparent resin extruded in the molten state was crystallized immediately after extruding from a die, resulting in an opaque resin.

Using the above pellets, a spiral flow length and a retention percentage of the flow length were determined.

<Results of Spiral Flow Length Measuring Test>

| | Spiral flow length |
|---|---|
| First shot | 290 [mm] |
| Tenth shot | 160 [mm] |
| Spiral flow length retention percentage | 55 [%] |

Various test pieces were molded in the same manner as in Example 5 and mechanical properties were measured. The results are shown in Table-3. The test pieces obtained in 1–5 shots were yellow, while the test pieces obtained in 20–25 shots were greenish yellow.

As is apparent from these results, the polyimide of this example caused lowering of the fluidity of the resin with a lapse of time on molding and, furthermore, the color tone and physical properties of the resulting test pieces were also changed. That is, it was difficult to stably mold the polyimide of this example and the product having stable physical properties could not be produced.

TABLE 3

| | 1–5 shots in average | 20–25 shots in average |
|---|---|---|
| Tensile strength [MPa] | 125 | 130 |
| Tensile elongation [%] | 5 | 4 |
| Flexural strength [MPa] | 260 | 270 |
| Flexural modulus [MPa] | 9280 | 12060 |
| Izod impact strength [J/m] | 50 | 30 |

COMPARATIVE EXAMPLE 8

E. process for Production of Polyimide

Polyimide was produced in the same manner as in Example 5 except that 1,3-bis(4-aminophenoxy)benzene (purity: 99.7%, content of azo compound: 0.94%) obtained in Comparative Example 4 was used and the amount of the raw material ⑧ and ⑨ was changed to the amount described below.

Raw material ⑧:

| Raw Material ⑧ | |
|---|---|
| 1,3-bis (4-aminophenoxy) benzene | 877.1 g (3.000 mol) |
| 3,3',4,4'-biphenyltetracarboxylic dianhydride | 865.0 g (2.940 mol) |
| Phthalic anhyride | 17.8 g (0.120 mol) |
| m-cresol | 15.0 kg |
| Raw Material ⑨ | |
| Phthalic anhydride | 17.8 g (0.120 mol) |

F. Physical Properties of Polyimide

The physical properties of the resulting polyimide were as follows.

| | |
|---|---|
| Yield | 1587 [g] |
| Yield | 96.1 [%] |
| Intrinsic viscosity | 1.31 [dl/g] |
| MV5 | 15200 [Pa.sec] |
| MV30 | 35000 [Pa.sec] |
| MVR | 2.30 |
| Form of strand | opaque yellow (sufficiently recrystallized) |
| MI5 | No flow [g/10 min.] |
| MI30 | No flow [g/10 min.] |
| MIR | — |
| Melting point (Tm) | 397 [° C.] |
| 5% weight loss temp. | 568 [° C.] |

G. Molding Test

The resulting polyimide powders were melt-molded at 450° C. to prepare opaque yellow pellets. The polyimide powders could not be extruded at 420° C. because of very high resin pressure.

Using the resulting pellets, a trial of molding was made at a cylinder temperature of 450° C., a mold temperature of 200° C. and an injection pressure of 147 MPa, but test pieces could not be obtained.

EXAMPLES 7 to 10

H. Molding Test of Composition

After the polyimide powders obtained in Example 5, glass fibers (CS-3PE-476S, manufactured by Nitto-Boseki Co.) or carbon fibers (HTA-C6-TX, manufactured by Toho Rayon Co.) were mixed in the proportion shown in Table 4, pellets were prepared in the same manner as in Example 3. Using the above pellets, various test pieces were molded in the same manner as Example 5, and then the tensile strength (ASTM D-638) and deflection temperature under load (ASTM D-648) were measured. The results are shown in Table-4.

As is apparent from these results, the molded article obtained from the composition made of the polyimide according to the present invention has excellent heat resistance and high strength.

TABLE 4

| Amount of fibers | Amount of resin | Deflection temperature | Tensile |
|---|---|---|---|

| Example | Kind of fibers | (% by weight) | (% by weight) | under load (° C.) | strength (MPa) |
|---|---|---|---|---|---|
| 7 | Glass fibers | 15 | 85 | 395 | 190 |
| 8 | Glass fibers | 30 | 70 | 400 | 210 |
| 9 | Carbon fibers | 15 | 85 | 390 | 180 |
| 10 | Carbon fibers | 30 | 70 | 395 | 180 |

Resin: polyimide powders obtained in Example 5
Glass fibers: CS-3PE-476S, manufactured by Nitto Boseki Co.
Carbon fibers: HTA-C6-TX, manufactured by Toho Rayon Co.

EXAMPLE 11

H. Thermal Stability Test of Molded Article

The test pieces obtained in Example 5 were frozen and ground to obtain polyimide powders, and then the melt viscosity (MV) at 420° C. and melt flow index (MFI) were measured. The results are shown in Table-5 [Table 5].

As is apparent from these results, the molded article obtained from the composition made of the polyimide according to the present invention has excellent melt fluidity and high stability of melt viscosity even if it is molten again with heating.

COMPARATIVE EXAMPLE 9

H. Thermal Stability Test of Molded Article

The test pieces obtained in Comparative Example 7 were frozen and ground to obtain polyimide powders, and then the melt viscosity (MV) at 420° C. and melt flow index (MFI) were measured. The results are shown in Table-5.

As is apparent from these results, the molded article obtained from the composition made of the polyimide according to the present invention caused lowering of the melt fluidity when it is molten again with heating. Furthermore, the fluidity of the resin was lowered with a lapse of time on molding.

TABLE 5

|  | Example 11 | Comparative Example 9 |
|---|---|---|
| Melt viscosity |  |  |
| MV5 [Pa.sec] | 970 | 2160 |
| MV30 [Pa.sec] | 1140 | 3890 |
| MVR | 1.18 | 1.80 |
| Melt flow index |  |  |
| MI5 [g/10 min.] | 23.5 | No flow |
| MI30 [g/10 min.] | 20.1 | — |
| MIR | 0.86 | — |

EXAMPLE 12

E. Process for Production of Polyimide

Polyimide was produced by using 1,3-bis(4-aminophenoxy)benzene (purity: 99.4%, content of azo compound: 0.07%) obtained in Example 1.

A raw material ⑧ was charged in a reaction vessel, heated to 200° C. with stirring in a nitrogen atmosphere and then reacted at 200° C. for 8 hours. After a lapse of 8 hours, a raw material ⑨ was added and the reaction was conducted for additional 4 hours. During the reaction, effusion of water (about 1.1 ml) was confirmed. During the reaction, the mass was transparent light yellow.

After the completion of the reaction, the reaction system was cooled to room temperature and 313 g of toluene was added dropwise over about 1 hour to deposit polyimide. After the slurry solution was filtered, the resulting polyimide cake was washed with toluene and dried in nitrogen at 300° C. for 4 hours to obtain yellow polyimide powders.

Raw material ⑧:

| 1,3-bis (4-aminophenoxy) benzene | 8.771 g (30.0 mmol) |
|---|---|
| 3,3',4,4'-biphenyltetracarboxylic dianhydride | 8.606 g (29.3 mmol) |
| Phthalic anhyride | 0.222 g (1.5 mmol) |
| m-cresol | 156.4 g |

Raw material ⑨:

| Phthalic anhydride | 0.222 g (1.5 mmol) |
|---|---|

F. Physical Properties of Polyimide

The physical properties of the resulting polyimide were as follows.

| Yield | 15.5 [g] |
|---|---|
| Yield | 93.9 [%] |
| Intrinsic viscosity | 1.09 [dl/g] |
| MV5 | 1450 [Pa.sec] |
| MV30 | 1790 [Pa.sec] |
| MVR | 1.24 |
| Melting point (Tm) | 398 [° C.] |
| 5% weight loss temp. | 572 [° C.] |

As a result of the measurement of the melt viscosity, the strand was opaque yellow. The thermal physical properties of the resulting strand were measured by DSC. As a result, the melting point (Tm) was confirmed at 398° C., while the glass transition temperature (Tg) and crystallization temperature (Tc) were not confirmed. This fact showed that this strand was sufficiently crystallized.

Figure 2:
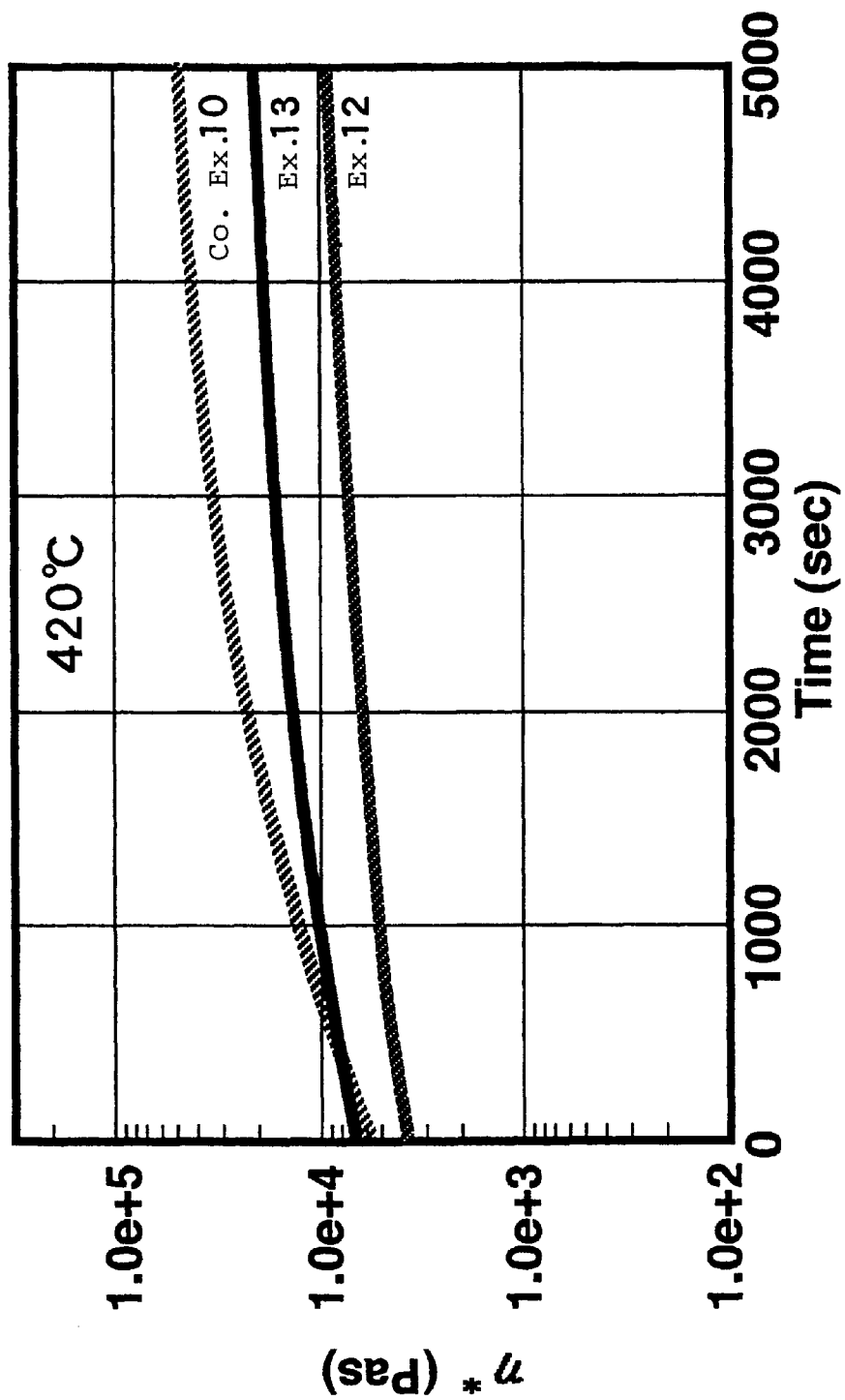
FIG. 2 is graph showing a change in melt viscosity with a lapse of time at 420° C. of polyimide obtained in Examples 12, 13 and Comparative Example 10.

A change in melt viscosity (η*) with a lapse of time of the resulting poymide is shown in FIG.-2.

As is apparent from these results, the polyimide of the present invention was superior in thermal stability in a molten state.

EXAMPLE 13

E. Process for Production of Polyimide

Polyimide was produced in the same manner as in Example 12, except that 1,3-bis(4-aminophenoxy)benzene (purity: 99.4%, content of azo compound: 0.07%) obtained in Example 1 was used and the amount of the raw materials ⑧ and ⑨ was changed to the amount described below.

Raw material ⑧:

| 1,3-bis (4-aminophenoxy) benzene | 8.771 g (30.0 mmol) |
|---|---|
| 3,3',4,4'-biphenyltetracarboxylic dianhydride | 8.650 g (29.4 mmol) |

-continued

| | |
|---|---|
| Phthalic anhyride | 0.177 g (1.2 mmol) |
| m-cresol | 156.4 g |
| Raw material ⑨: | |
| Phthalic anhydride | 0.177 g (1.2 mmol) |

F. Physical Properties of Polyimide

The physical properties of the resulting polyimide are shown in Table-6.

A change in melt viscosity ($\eta^*$) with a lapse of time of the resulting poymide is shown in FIG.-2.

As is apparent from these results, the polyimide of the present invention was superior in thermal stability in a molten state.

EXAMPLE 14

E. Process for Production of Polyimide

Polyimide was produced in the same manner as in Example 12, except that 1,3-bis(4-aminophenoxy)benzene (purity: 99.6%, content of azo compound: 0.05%) obtained in Example 2 was used.

F. Physical Properties of Polyimide

The physical properties of the resulting polyimide are shown in Table-6.

As is apparent from these results, the polyimide of the present invention was superior in thermal stability in a molten state.

EXAMPLE 15

E. Process for Production of Polyimide

Polyimide was produced in the same manner as in Example 12, except that 1,3-bis(4-aminophenoxy)benzene (purity: 99.5%, content of azo compound: 0.08%) obtained in Example 3 was used.

F. Physical Properties of Polyimide

The physical properties of the resulting polyimide are shown in Table-6.

As is apparent from these results, the polyimide of the present invention was superior in thermal stability in a molten state.

COMPARATIVE EXAMPLE 10

E. Process for Production of Polyimide

Polyimide was produced in the same manner as in Example 12, except that 1,3-bis(4-aminophenoxy)benzene (purity: 99.6%, content of azo compound: 0.75%) obtained in Comparative Example 1 was used.

F. Physical Properties of Polyimide

The physical properties of the resulting polyimide are shown in Table-6.

A change in melt viscosity ($\eta^*$) with a lapse of time of the resulting poymide is shown in FIG.-2.

As is apparent from these results, the polyimide of this example was inferior in thermal stability in a molten state.

COMPARATIVE EXAMPLE 11

E. Process for Production of Polyimide

Polyimide was produced in the same manner as in Example 12, except that 1,3-bis(4-aminophenoxy)benzene (purity: 99.6%, content of azo compound: 0.82%) obtained in Comparative Example 2 was used.

F. Physical Properties of Polyimide

The physical properties of the resulting polyimide are shown in Table-6.

As is apparent from these results, the polyimide of this example was inferior in thermal stability in a molten state.

COMPARATIVE EXAMPLE 12

E. Process for Production of Polyimide

Polyimide was produced in the same manner as in Example 12, except that 1,3-bis(4-aminophenoxy)benzene (purity: 99.7%, content of azo compound: 0.75%) obtained in Comparative Example 3 was used.

F. Physical Properties of Polyimide

The physical properties of the resulting polyimide are shown in Table-6.

As is apparent from these results, the polyimide of this example was inferior in thermal stability in a molten state.

COMPARATIVE EXAMPLE 13

E. Process for Production of Polyimide

Polyimide was produced in the same manner as in Example 12, except that 1,3-bis(4-aminophenoxy)benzene (purity: 99.7%, content of azo compound: 0.94%) obtained in Comparative Example 4 was used and the amount of the raw materials ⑧ and ⑨ was changed to the amount described below.

| | |
|---|---|
| Raw material ⑧: | |
| 1,3-bis (4-aminophenoxy) benzene | 8.771 g (30.0 mmol) |
| 3,3',4,4'-biphenyltetracarboxylic dianhydride | 8.562 g (29.1 mmol) |
| Phthalic anhyride | 0.267 g (1.8 mmol) |
| m-cresol | 156.4 g |
| Raw material ⑨ | |
| Phthalic anhydride | 0.267 g (1.8 mmol) |

F. Physical Properties of Polyimide

The physical properties of the resulting polyimide are shown in Table-6.

As is apparent from these results, the polyimide of this example was inferior in thermal stability in a molten state.

COMPARATIVE EXAMPLE 14

E. Process for Production of Polyimide

Polyimide was produced in the same manner as in Example 12, except that 1,3-bis(4-aminophenoxy)benzene (purity: 99.9%, content of azo compound: 0.82%) obtained in Comparative Example 5 was used.

F. Physical Properties of Polyimide

The physical properties of the resulting polyimide are shown in Table-6.

As is apparent from these results, the polyimide of this example was inferior in thermal stability in a molten state.

COMPARATIVE EXAMPLE 15

E. Process for Production of Polyimide

Polyimide was produced in the same manner as in Example 12, except that 1,3-bis(4-aminophenoxy)benzene (purity: 99.9%, content of azo compound: 0.65%) obtained in Comparative Example 6 was used.

F. Physical Properties of Polyimide

The physical properties of the resulting polyimide are shown in Table-6.

TABLE 6

|  | Monomer used | Azo content (% by wt.) | Polyimide |  |  |  |  |  |  |
|---|---|---|---|---|---|---|---|---|---|
|  | Kind |  | Yield (g) | Yield (%) | η inh (dl/g) | MV5 (Pa. sec) | MV30 (Pa. sec) | MVR | Tm (° C.) | Td5 (° C.) |
| Example 12 | Example 1 | 0.07 | 15.50 | 93.9 | 1.09 | 1450 | 1790 | 1.24 | 398 | 572 |
| Example 13 | Example 1 | 0.07 | 15.69 | 95.0 | 1.19 | 3410 | 4480 | 1.31 | 400 | 576 |
| Example 14 | Example 2 | 0.05 | 15.82 | 95.8 | 1.04 | 1390 | 1660 | 1.19 | 397 | 570 |
| Example 15 | Example 3 | 0.08 | 15.71 | 95.1 | 1.05 | 1440 | 1910 | 1.33 | 398 | 571 |
| Comp. Example 10 | Comp. Example 1 | 0.75 | 15.60 | 94.4 | 1.11 | 1810 | 2750 | 1.52 | 397 | 567 |
| Comp. Example 11 | Comp. Example 2 | 0.82 | 15.93 | 96.4 | 0.94 | 1120 | 1750 | 1.56 | 398 | 569 |
| Comp. Example 12 | Comp. Example 3 | 0.75 | 15.55 | 94.2 | 1.02 | 1350 | 2090 | 1.55 | 397 | 569 |
| Comp. Example 13 | Comp. Example 4 | 0.94 | 15.48 | 93.7 | 1.09 | 1690 | 2890 | 1.71 | 397 | 560 |
| Comp. Example 14 | Comp. Example 5 | 0.82 | 15.51 | 93.9 | 1.17 | 4810 | 9630 | 2.00 | 398 | 564 |
| Comp. Example 15 | Comp. Example 6 | 0.65 | 15.61 | 94.5 | 1.14 | 1900 | 2920 | 1.54 | 398 | 566 |

[Legend of Table-6]
⑩ Azo Content: content of azo compound in 1,3-bis(4-aminophenoxy)benzene
① η inh: intrinsic viscosity
② MV: melt viscosity
MV5: melt viscosity determined when melting a sample with maintaining at 420° C. for 5 minutes
MV30: melt viscosity determined when melting a sample with maintaining at 420° C. for 30 minutes
MVR: melt viscosity ratio MVR = MV30/MV5
⑦ Tm: melting point
⑥ Td: 5% weight loss temperature As is apparent from these results, the polyimide of this example was inferior in thermal stability in a molten state.

EXAMPLE 16

E. Process for Production of Polyimide

Polyimide was produced in the same manner as in Example 12, except that 1,3-bis(4-aminophenoxy)benzene (purity: 99.2%, content of azo compound: 0.09%) obtained in Example 4 was used.

F. Physical Properties of Polyimide

The physical properties of the resulting polyimide are shown in Table-7.

As is apparent from these results, the polyimide of the present invention was superior in thermal stability in a molten state.

EXAMPLE 17

E. Process for Production of Polyimide

Polyimide was produced in the same manner as in Example 12, except that the reaction was conducted at 180° C. under o-dichlorobenzene reflux using 1,3-bis(4-aminophenoxy)benzene (purity: 99.2%, content of azo compound: 0.09%) obtained in Example 4 and the raw materials ⑧ and ⑨ described below. From 1 hour after the beginning of the polymerization, yellow powders were deposited and then converted into a slurry.

| Raw material ⑧: | |
|---|---|
| 1,3-bis(4-aminophenoxy)benzene | 8.771 g (30.0 mmol) |
| 3,3',4,4'-biphenyltetracarboxylic dianhydride | 8.606 g (29.3 mmol) |
| Phthalic anhyride | 0.222 g (1.5 mmol) |
| N-methyl-2-pyrrolidone | 156.4 g |
| o-dichlorobenzene | 31.3 g |
| Raw material ⑨: | |
| Phthalic anhyride | 0.222 g (1.5 mmol) |

F. Physical Properties of Polyimide

The physical properties of the resulting polyimide are shown in Table 7.

As is apparent from these results, the polyimide of the present invention was superior in thermal stability in a molten state.

EXAMPLE 18

E. Process for Production of Polyimide

Polyimide was produced in the same manner as in Example 12, except that the reaction was conducted at 180° C. under o-dichlorobenzene reflux using 1,3-bis(4-aminophenoxy)benzene (purity: 99.2%, content of azo compound: 0.09%) obtained in Example 4 and the raw materials ⑧ and ⑨ described below.

| Raw material ⑧: | |
|---|---|
| 1,3-bis(4-aminophenoxy)benzene | 8.771 g (30.0 mmol) |
| 3,3',4,4'-biphenyltetracarboxylic dianhydride | 8.606 g (29.3 mmol) |
| Phthalic anhyride | 0.222 g (1.5 mmol) |
| m-cresol | 156.4 g |
| o-dichlorobenzene | 31.3 g |
| Raw material ⑨: | |
| Phthalic anhydride | 0.222 g (1.5 mmol) |

F. Physical Properties of Polyimide

The physical properties of the resulting polyimide are shown in Table-7.

As is apparent from these results, the polyimide of the present invention was superior in thermal stability in a molten state.

EXAMPLE 19

E. Process for Production of Polyimide

Polyimide was produced in the same manner as in Example 12, except that the reaction was conducted using 1,3-bis(4-aminophenoxy)benzene (purity: 99.2%, content of azo compound: 0.09%) obtained in Example 4 and the raw materials ⑧ and ⑨ described below. As a mixed cresol, synthetic m-cresol and synthetic p-cresol (manufactured by Mitsui Chemicals, Inc.) were used.

| Raw material ⑧: | |
|---|---|
| 1,3-bis(4-aminophenoxy)benzene | 8.771 g (30.0 mmol) |
| 3,3',4,4'-biphenyltetracarboxylic dianhydride | 8.606 g (29.3 mmol) |
| Phthalic anhyride | 0.222 g (1.5 mmol) |
| Mixed cresol | 156.4 g |
| Raw material ⑨: | |
| Phthalic anhydride | 0.222 g (1.5 mmol) |

F. Physical Properties of Polyimide

The physical properties of the. resulting polyimide are shown in Table-7.

As is apparent from these results, the polylmide of the present invention was superior in thermal stability in a molten state.

EXAMPLE 20

E. Process for Production of Polyimide

Polyimide was produced in the same manner as in Example 12, except that the reaction was conducted at 150° C. for 24 hours using 1,3-bis(4-aminophenoxy)benzene (purity: 99.2%, content of azo compound: 0.09%) obtained in Example 4 and the reaction was conducted for additional 12 hours after adding the raw material ⑨.

F. Physical Properties of Polyimide

The physical properties of the resulting polyimide are shown in Table-7.

As is apparent from these results, the polyimide of the present invention was superior in thermal stability in a molten state.

EXAMPLE 21

E. Process for Production of Polyimide

Polyimide was produced in the same manner as in Example 12, except that 1,3-bis(4-aminophenoxy)benzene (purity: 99.2%, content of azo compound: 0.09%) obtained in Example 4 was used and the amount of the raw material ⑨ was changed to the amount described below.

| Raw material ⑨: | |
|---|---|
| Phthalic anhydride | 0.000 g (0.0 mmol) |

F. Physical Properties of Polyimide

The physical properties of the resulting polyimide are shown in Table-7.

As is apparent from these results, the polyimide of the present invention was superior in thermal stability in a molten state.

EXAMPLE 22

E. Process for Production of Polyimide

Polyimide was produced in the same manner as in Example 12, except that 1,3-bis(4-aminophenoxy)benzene (purity: 99.2%, content of azo compound: 0.09%) obtained in Example 4 was used and the amount of the raw material ⑧; was changed to the amount described below.

| Raw material ⑧: | |
|---|---|
| 1,3-bis(4-aminophenoxy)benzene | 8.771 g (30.0 mmol) |
| 3,3',4,4'-biphenyltetracarboxylic dianhydride | 8.606 g (29.3 mmol) |
| Phthalic anhydride | 0.000 g (0.0 mmol) |
| m-cresol | 156.4 g |

F. Physical Properties of Polyimide

The physical properties of the resulting polyimide are shown in Table-7.

As is apparent from these results, the polyimide of the present invention was superior in thermal stability in a molten state.

EXAMPLE 23

E. Process for Production of Polyimide

Polyimide was produced in the same manner as in Example 12, except that the reaction was conducted using 1,3-bis(4-aminophenoxy)benzene (purity: 99.2%, content of azo compound: 0.09%) obtained in Example 4 and the raw materials ⑧ and ⑨ described below.

| Raw material ⑧: | |
|---|---|
| 1,3-bis(4-aminophenoxy)benzene | 8.508 g (29.1 mmol) |
| 3,3',4,4'-biphenyltetracarboxylic dianhydride | 8.827 g (30.0 mmol) |
| Aniline | 0.168 g (1.8 mmol) |
| m-cresol | 156.4 g |
| Raw material ⑨: | |
| Phthalic anhydride | 0.168 g (1.8 mmol) |

F. Physical Properties of Polyimide

The physical properties of the resulting polyimide are shown in Table-7.

As is apparent from these results, the polyimide of the present invention was superior in thermal stability in a molten state.

EXAMPLE 24

E. Process for Production of Polyimide

Polyimide was produced in the same manner as in Example 12, except that the reaction was conducted using 1,3-bis(4-aminophenoxy)benzene (purity: 99.2%, content of azo compound: 0.09%) obtained in Example 4 and the raw materials ⑧ and ⑨ described below.

Raw material ⑧:

| | |
|---|---|
| 1,3-bis(4-aminophenoxy)benzene | 8.771 g (30.0 mmol) |
| 3,3',4,4'-biphenyltetracarboxylic dianhydride | 8.606 g (29.3 mmol) |
| Chlorophthalic anhyride | 0.274 g (1.5 mmol) |
| m-cresol | 156.4 g |

Raw material ⑨:

| | |
|---|---|
| Chlorophthalic anhydride | 0.274 g (1.5 mmol) |

F. Physical Properties of Polyimide

The physical properties of the resulting polyimide are shown in Table-7.

TABLE 7

| | Yield (g) | Yield (%) | η inh (dl/g) | MV5 (Pa. sec) | MV30 (Pa. sec) | MVR | Tm (° C.) | Td5 (° C.) |
|---|---|---|---|---|---|---|---|---|
| Example 16 | 15.72 | 95.2 | 1.03 | 1380 | 1630 | 1.18 | 398 | 572 |
| Example 17 | 15.58 | 94.3 | 1.07 | 1480 | 2020 | 1.37 | 396 | 569 |
| Example 18 | 15.52 | 94.0 | 1.02 | 1350 | 1610 | 1.20 | 398 | 572 |
| Example 19 | 15.69 | 95.0 | 1.03 | 1370 | 1600 | 1.17 | 398 | 572 |
| Example 20 | 15.66 | 94.8 | 1.02 | 1360 | 1650 | 1.21 | 398 | 572 |
| Example 21 | 15.66 | 94.8 | 1.05 | 1420 | 1730 | 1.22 | 398 | 572 |
| Example 22 | 15.71 | 95.1 | 1.07 | 1490 | 1870 | 1.26 | 398 | 572 |
| Example 23 | 15.34 | 93.4 | 1.14 | 2630 | 3580 | 1.36 | 399 | 567 |
| Example 24 | 15.63 | 94.0 | 1.03 | 1390 | 1640 | 1.18 | 398 | 572 |

(Legend of Table-7 is same to Table-6.)

As is apparent from these results, the polyimide of the present invention was superior in thermal stability in a molten state.

EXAMPLE 25

E. Process for Production of Polyimide

Polyimide was produced by using 1,3-bis(4-aminophenoxy)benzene (purity: 99.4%, content of azo compound: 0.07%) obtained in Example 1.

A raw material ⑧ was charged in a reaction vessel, heated to 200° C. with stirring in a nitrogen atmosphere and then reacted at 200° C. for 8 hours. After a lapse of 8 hours, a raw material ⑨ was added and the reaction was conducted for additional 4 hours. During the reaction, effusion of water (about 1.1 ml) was confirmed. During the reaction, the mass was transparent light yellow.

After the completion of the reaction, the reaction system was cooled to room temperature and 313 g of toluene was added dropwise over about 1 hour to deposit polyimide. After the slurry solution was filtered, the resulting polyimide cake was washed with toluene and dried in nitrogen at 300° C. for 4 hours to obtain yellow polyimide powders.

Raw material ⑧:

| | |
|---|---|
| 1,3-bis(4-aminophenoxy)benzene | 8.771 g (30.0 mmol) |
| 3,3',4,4'-biphenyltetracarboxylic dianhydride | 7.745 g (26.3 mmol) |
| Pyromellitic dianhyride | 0.638 g (2.9 mmol) |
| Phthalic anhydride | 0.222 g (1.5 mmol) |
| m-cresol | 158.8 g |

Raw material ⑨:

| | |
|---|---|
| Phthalic anhydride | 0.222 g (1.5 mmol) |

F. Physical Properties of Polyimide

The physical properties and crystallization behavior of the resulting polyimide are shown in Table-8 and Table-9, respectively.

EXAMPLE 26

E. Process for Production of Polyimide

Polyimide was produced in the same manner as in Example 25, except that the reaction was conducted using 1,3-bis(4-aminophenoxy)benzene (purity: 99.4%, content of azo compound: 0.07%) obtained in Example 1 and the raw material ⑧ described below.

Raw material ⑧:

| | |
|---|---|
| 1,3-bis(4-aminophenoxy)benzene | 8.771 g (30.0 mmol) |
| 3,3',4,4'-biphenyltetracarboxylic dianhydride | 8.606 g (29.3 mmol) |
| 2,2-bis(4-(3,4-dicarboxyphenyl)propane dianhydride | 1.522 g (2.9 mmol) |
| Phthalic anhydride | 0.222 g (1.5 mmol) |
| m-cresol | 158.8 g |

F. Physical Properties of Polyimide

The physical properties and crystallization behavior of the resulting polyimide are shown in Table-8 and Table-9, respectively.

EXAMPLE 27

E. Process for Production of Polyimide

Polyimide was produced in the same manner as in Example 25, except that the reaction was conducted using 1,3-bis(4-aminophenoxy)benzene (purity: 99.4%, content of azo compound: 0.07%) obtained in Example 1 and the raw material ⑧ described below.

Raw material ⑧:

| | |
|---|---|
| 1,3-bis(4-aminophenoxy)benzene | 7.894 g (27.0 mmol) |
| 4,4-bis(3-aminophenoxy)benzene | 1.105 g (3.0 mmol) |
| 3,3',4,4'-biphenyltetracarboxylic dianhydride | 8.606 g (29.3 mmol) |
| Phthalic anhydride | 0.222 g (1.5 mmol) |
| m-cresol | 158.8 g |

F. Physical Properties of Polyimide

The physical properties and crystallization behavior of the resulting polyimide are shown in Table-8 and Table-9, respectively.

EXAMPLE 28

E. Process for Production of Polyimide

Polyimide was produced in the same manner as in Example 25, except that the reaction was conducted using 1,3-bis(4-aminophenoxy)benzene (purity: 99.4%, content of azo compound: 0.07%) obtained in Example 1 and the raw material ⑧ described below.

Raw material ⑧:

| | |
|---|---|
| 1,3-bis(4-aminophenoxy)benzene | 7.894 g (27.0 mmol) |
| 1,3-bis(3-aminophenoxy)benzene | 0.877 g (3.0 mmol) |
| 3,3',4,4'-biphenyltetracarboxylic dianhydride | 8.606 g (29.3 mmol) |
| Phthalic anhydride | 0.222 g (1.5 mmol) |
| m-cresol | 158.8 g |

F. Physical Properties of Polyimide

The physical properties and crystallization behavior of the resulting polyimide are shown in Table-8 and Table-9, respectively.

TABLE 8

| | Yield (g) | Yield (%) | η inh (dl/g) | MV5 (Pa. sec) | MV30 (Pa. sec) | MVR | Tm (° C.) | Td5 (° C.) |
|---|---|---|---|---|---|---|---|---|
| Example 25 | 15.38 | 94.4 | 1.02 | 980 | 1240 | 1.27 | 391 | 565 |
| Example 26 | 16.18 | 94.2 | 1.01 | 1540 | 1990 | 1.29 | 380 | 563 |
| Example 27 | 15.94 | 95.2 | 1.04 | 1700 | 2080 | 1.22 | 381 | 569 |
| Example 28 | 15.71 | 95.1 | 1.04 | 1590 | 2020 | 1.27 | 380 | 565 |
| Example 29 | 15.41 | 94.9 | 1.01 | 1980 | 2680 | 1.35 | 383 | 558 |

(Legend of Table-8 is same to Table-6.)

EXAMPLE 29

E. Process for Production of Polyimide

Polyimide was produced in the same manner as in Example 25, except that the reaction was conducted using 1,13-bis(4-aminophenoxy)benzene (purity: 99.4%, content of azo compound: 0.07%) obtained in Example 1 and the raw material ⑧ described below.

Raw material ⑧:

| | |
|---|---|
| 1,3-bis(4-aminophenoxy)benzene | 7.894 g (27.0 mmol) |
| 4,4-diaminophenyl ether | 0.601 g (3.0 mmol) |
| 3,3',4,4'-biphenyltetracarboxylic dianhydride | 8.606 g (29.3 mmol) |
| Phthalic anhydride | 0.222 g (1.5 mmol) |
| m-cresol | 158.8 g |

F. Physical Properties of Polyimide

The physical properties and crystallization behavior of the resulting polyimide are shown in Table-8 and Table-9, respectively.

TABLE 9

| | Temperature drop process | | Temperature rise process (second time) | | | |
|---|---|---|---|---|---|---|
| | Tc (° C.) | ΔHc (J/g) | Tc | ΔHc (J/g) | Tm | ΔHm (J/g) |
| Example 12 | 318 | 33 | ND | ND | 398 | 34 |
| Example 25 | 307 | 19 | 239 | 8 | 391 | 29 |
| Example 26 | 395 | 8 | 227 | 10 | 380 | 18 |
| Example 27 | 306 | 14 | 236 | 12 | 381 | 28 |
| Example 28 | 275 | 8 | 227 | 10 | 380 | 18 |
| Example 29 | 288 | 9 | 236 | 13 | 383 | 24 |

⑧ Crystallization behavior: It was measured by the DSC in accordance with the following pattern.
First stage (temperature rise process (first time))
25° C.→430° C. (temperature rise rate: 10° C./min.)
Second stage (temperature drop process) 430° C.→50° C. (cooling rate: 50° C./min.)
Third stage (temperature rise process (second time)) 50° C.→430° C. (temperature rise rate: 10° C./min.)
Tc: crystallization temperature (° C.)
ΔHc: crystallization energy (J/g)
Tm: melting point (° C.)
ΔHm: melting energy (J/g)
ND: not detected Effect of the Invention:

The thermoplastic polyimide of the present invention has at least excellent characteristics ① to ④ described below.

① It is superior in thermal stability on melting. That is, the degree of lowering of the fluidity on melting with a lapse of time is small. It was difficult to realize this feature in the prior art.

② It has high heat resistance. That is, it has excellent mechanical strength even at the temperature higher than a glass transition temperature (Tg) because of its high crystallizability.

③ It is superior in productivity. That is, since a crystallization rate is large, it is crystallized during a normal short molding cycle without requiring a special heat-treating operation such as operation of slowly cooling in a mold on molding, operation of heat-treating after molding or the like.

④ It is superior in dimensional accuracy. That is, since a crystallization rate is large and it is crystallized in a mold on molding, the degree of shrinkage after molding is small.

The aromatic diamine compound of the present invention has at least excellent characteristics ⑤ to ⑥ described below.

⑤ The content of an azo compound is very small.
⑥ A polyimide resin having excellent thermal stability on melting can be obtained.

The thermoplastic polyimide according to the present invention has a feature that the thermal stability on melting is good. That is, the thermoplastic polyimide can be applied to conventional melt molding because of less lowering in fluidity with a lapse of time on melting.

This feature is obtained only in the case where an aromatic diamine containing a small amount of an azo compound according to the present invention is used. That is, this feature can not be easily anticipated by persons skilled in the art and is a knowledge that could have been attained for the first time by the present inventors.

What is claimed is:

1. A thermoplastic polyimide having good thermal stability, comprising a repeating unit represented by the chemical formula (1), a molecular terminal being composed of the chemical formula (2) and/or chemical formula (3), characterized in that:
said polyimide has a melt viscosity ratio calculated by the numerical formula (1) within a numerical range shown in the numerical formula (2)

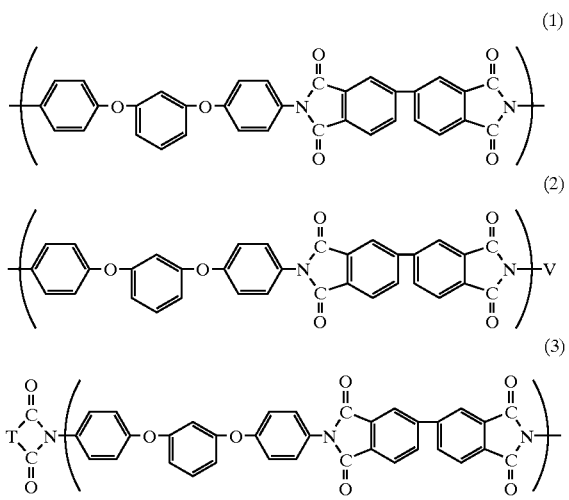

(1)

(2)

(3)

wherein the V of chemical formula 2 is a monovalent aromatic group, and T of chemical formula 3 is a divalent aromatic group; and
wherein Numerical Formula 1 is $$MVR = MV30/MV5 \tag{1}$$

wherein in the numerical formula (1), MV5 is a melt viscosity (Pa.sec) determined by melting a sample and maintaining at 420° C. for five minutes and measuring at a shear rate within a range from 30 to 500 sec$^{-1}$, and MV30 is a melt viscosity (Pa.sec) determined by melting a sample and maintaining at 420° C. for 30 minutes and measuring at a shear rate within a range from 30 to 500 sec$^{-1}$; and
Numerical Formula 2 is $$1.0 \leq MVR \leq 1.5 \tag{2}$$

wherein in the numerical formula (2), MVR is a melt viscosity ratio calculated by the numerical formula (1).

2. A thermoplastic polyimide having good thermal stability, comprising a repeating unit represented by the chemical formula (1), a molecular terminal being composed of the chemical formula (2) and/or chemical formula (3), characterized in that:
   a melt flow index retention MIR calculated by the numerical formula (3) is within a numerical range shown in the numerical formula (4)
Numerical Formula 3

$$MIR = MI30/MI5 \tag{3}$$

(in the numerical formula (3), MI5 is MI (g/10 min.) determined by melting a sample with maintaining at 420° C. for 5 minutes and measuring under a load of 10.3 N in accordance with ASTM D-1238 and MI30 is MI (g/10 min.) determined by melting a sample with maintaining at 420° C. for 30 minutes and measuring)

Numerical Formula 4

$$0.7 \leq MIR \leq 1.0 \tag{4}$$

(in the numerical formula (4), MIR is a melt index retention calculated by the numerical formula (3)).

3. 1,3-bis(4-aminophenoxy)benzene represented by the chemical formula (4), characterized in that the content of an azo compound is from 0.0 to 0.2%.

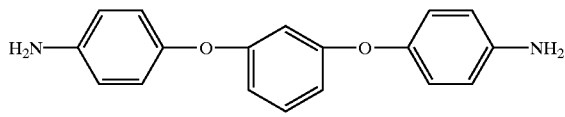

(4)

4. 1,3-bis(4-aminophenoxy)benzene according to claim 3, wherein the azo compound is at least one selected from the group consisting of compounds represented by the chemical formulas (5) to (7).

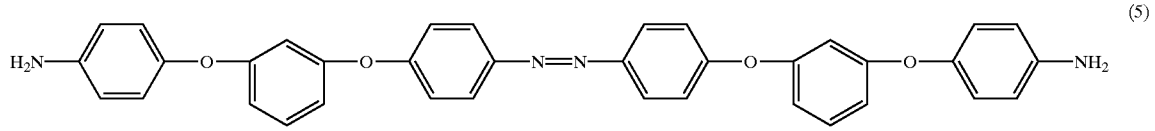

(5)

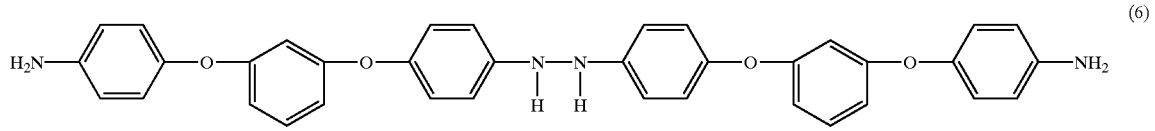

(6)

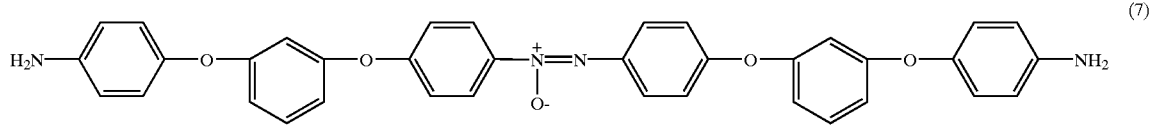

(7)

5. 1,3-bis(4-aminophenoxy)benzene according to claim 4, which is used for production of a thermoplastic polyimide resin having good thermal stability.

6. A method for producing a thermoplastic polyimide having good thermal stability, which comprises using 1,3-bis(4-aminophenoxy)benzene represented by the chemical formula (8), 3,3',4,4'-biphenyltetracarboxylic dianhydride represented by the chemical formula (9), monoamine represented by the chemical formula (10) and/or dicarboxylic anhydride represented by the chemical formula (11), characterized in that:

the content of an azo compound of 1,3-bis(4-aminophneoxy)benzene represented by the chemical formula (8) is from 0.0 to 0.2%

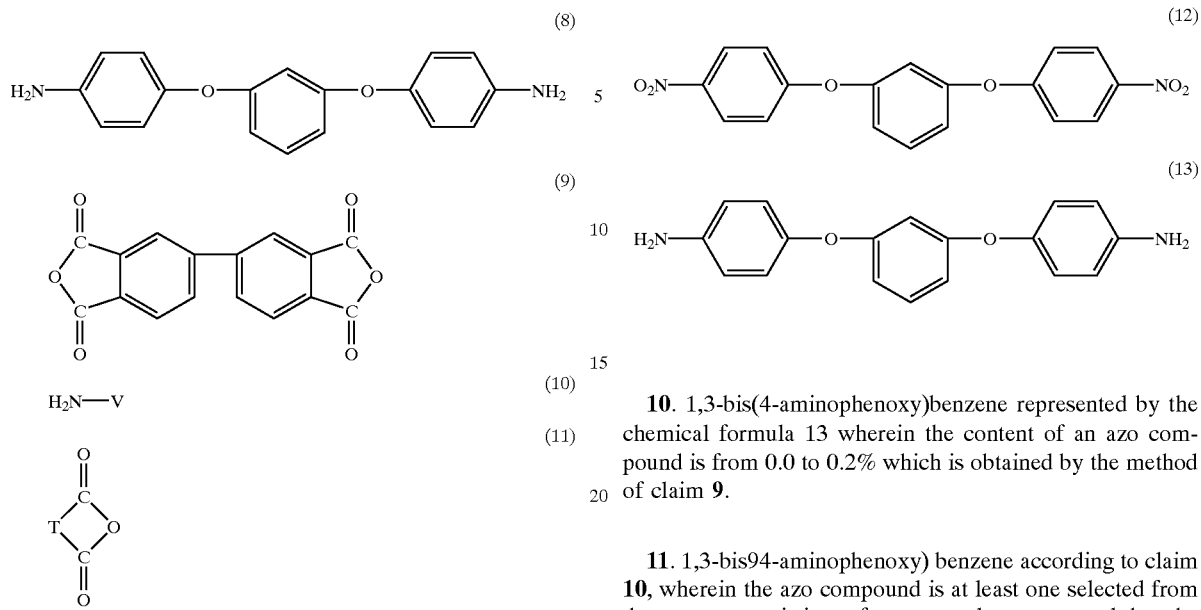

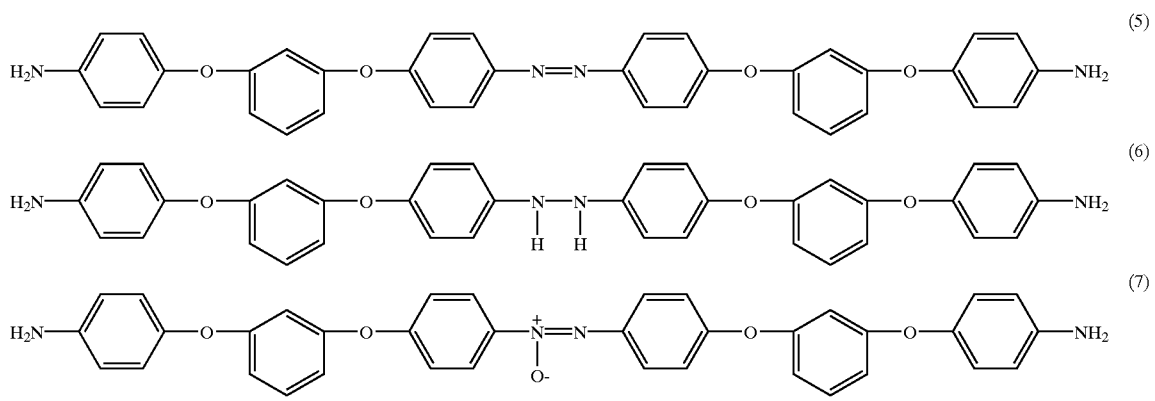

(in the chemical formula (10), V is a monovalent aromatic group and, in the chemical formula (11), T is a divalent aromatic group).

7. The method for producing a thermoplastic polyimide having good thermal stability according to claim 6, wherein the azo compound is at least one selected from the group consisting of compounds represented by the chemical formulas (5) to (7).

8. A thermoplastic polyimide having good thermal stability obtained by the method of claim 7.

9. A method for producing 1,3-bis(4-aminophenoxy) benzene represented by the chemical formula (13), which comprises previously charging a reaction solvent and a catalyst and hydrogen and then reducing 1,3-bis(4-nitrophenoxy)benzene represented by the chemical formula (12) with gradually adding said 1,3-bis(4-nitrophenoxy) benzene in a reaction vessel into which hydrogen is introduced.

10. 1,3-bis(4-aminophenoxy)benzene represented by the chemical formula 13 wherein the content of an azo compound is from 0.0 to 0.2% which is obtained by the method of claim 9.

11. 1,3-bis94-aminophenoxy) benzene according to claim 10, wherein the azo compound is at least one selected from the group consisting of compounds represented by the chemical formulas (5) to (7).

12. A molded article comprising a thermoplastic polyimide having a repeating unit represented by the chemical formula (1), a molecular terminal being composed of the chemical formula (2) and/or chemical formula (3), characterized in that:
when the molded article is molten, a melt viscosity ratio MVR calculated by the numerical formula (1) is within a numerical range shown in the numerical formula (2)
Numerical Formula 1

$$MVR=MV30/MV5 \quad (1)$$

(in the numerical formula (1), MV5 is a melt viscosity (Pa.sec) determined by melting a sample with maintaining at 420° C. for 5 minutes and measuring at a shear rate within a range from 30 to 500 [sec$^{-1}$], and MV30 is a melt viscosity (Pa.sec) determined by melting a sample with maintaining at 420° C. for 30 minutes and measuring at a shear rate within a range from 30 to 500 (sec$^{-1}$]))
Numerical Formula 2

$$1.0 \leq MVR \leq 1.5 \quad (2)$$

(in the numerical formula (2), MVR is a melt viscosity ratio calculated by the numerical formula (1)).

13. A molded article comprising a thermoplastic polyimide having a repeating unit represented by the chemical formula (1), a molecular terminal being composed of the chemical formula (2) and/or chemical formula (3), characterized in that:

when the molded article is molten, a melt index retention MIR calculated by the numerical formula (3) is within a numerical range shown in the numerical formula (4)

Numerical Formula 3

$$MIR = MI30/MI5 \qquad (3)$$

(in the numerical formula (3), MI5 is MI ([g/10 min.]) determined by melting a sample with maintaining at 420° C. for 5 minutes and measuring under a load of 10.3 N in accordance with ASTM D-1238 and MI30 is MI ([g/10 min.]) determined by melting a sample with maintaining at 420° C. for 30 minutes and measuring)

Numerical Formula 4

$$0.7 \leq MIR \leq 1.0 \qquad (4)$$

(in the numerical formula (4), MIR is a melt index retention calculated by the numerical formula (3)).

14. 1,3-bis(4-aminophenoxy)benzene according to claim 3, which is used for production of a thermoplastic polyimide resin having good thermal stability.

15. A thermoplastic polyimide having good thermal stability obtained by the method of claim 6.

16. 1,3-bis(4-aminophenoxy)benzene represented by the chemical formula 13 wherein the content of an azo compound is from 0.0 to 0.2%, which is obtained by the method of claim 9.

* * * * *